United States Patent
Yamamoto et al.

(10) Patent No.: US 8,457,582 B2
(45) Date of Patent: Jun. 4, 2013

(54) ADAPTIVE CONTROL APPARATUS USING MULTIPLE ADAPTIVE CONTROL METHODS

(75) Inventors: Atsushi Yamamoto, Kyoto (JP); Koichi Ogawa, Osaka (JP); Hiroshi Iwai, Osaka (JP); Yoshio Koyanagi, Kanagawa (JP); Akira Kato, Osaka (JP)

(73) Assignee: Panasonic Corporation, Osaka (JP)

( * ) Notice: Subject to any disclaimer, the term of this patent is extended or adjusted under 35 U.S.C. 154(b) by 998 days.

(21) Appl. No.: 12/282,954

(22) PCT Filed: Mar. 15, 2007

(86) PCT No.: PCT/JP2007/055227
§ 371 (c)(1),
(2), (4) Date: Jan. 5, 2009

(87) PCT Pub. No.: WO2007/105796
PCT Pub. Date: Sep. 20, 2007

(65) Prior Publication Data
US 2009/0221253 A1    Sep. 3, 2009

(30) Foreign Application Priority Data
Mar. 15, 2006  (JP) ................. 2006-070359

(51) Int. Cl.
*H04B 1/06*   (2006.01)
(52) U.S. Cl.
USPC ............ 455/273; 455/69; 455/562.1
(58) Field of Classification Search
USPC ....................................... 455/273
See application file for complete search history.

(56) References Cited

U.S. PATENT DOCUMENTS

| | | | |
|---|---|---|---|
| 6,590,532 | B1 | 7/2003 | Ogawa et al. |
| 7,043,217 | B2 | 5/2006 | Tanaka |
| 2003/0003890 | A1 | 1/2003 | Tanaka |
| 2005/0169403 | A1 | 8/2005 | Doi |

(Continued)

FOREIGN PATENT DOCUMENTS

| | | |
|---|---|---|
| EP | 1 189 364 | 3/2002 |
| EP | 1 248 385 | 10/2002 |

(Continued)

OTHER PUBLICATIONS

International Search Report issued Jun. 12, 2007 in the International (PCT) Application No. PCT/JP2007/055227.

(Continued)

*Primary Examiner* — Ajibola Akinyemi
(74) *Attorney, Agent, or Firm* — Wenderoth, Lind & Ponack, L.L.P.

(57) ABSTRACT

In the adaptive control apparatus, a computation unit computes weighting coefficients, using a first adaptive control method in a proportion α of a first computation amount, where the first adaptive control method has a first convergence rate and a first convergence error. Further, a computation unit computes weighting coefficients from initial values of the weighting coefficients computed by the computation unit, using a second adaptive control method in a proportion (1−α) of a second computation amount, where the second adaptive control method has a second convergence rate slower than the first convergence rate and a second convergence error smaller than the first convergence error. A controller controls determination of a ratio α/(1−α) based on a moving speed of a mobile unit, and controls the computation units to perform computing processes.

11 Claims, 16 Drawing Sheets

U.S. PATENT DOCUMENTS

| | | |
|---|---|---|
| 2005/0175121 A1 | 8/2005 | Doi |
| 2005/0180535 A1 | 8/2005 | Doi |
| 2005/0197071 A1* | 9/2005 | Yoshida et al. .................. 455/69 |
| 2006/0189356 A1* | 8/2006 | Obayashi .................. 455/562.1 |
| 2006/0256899 A1 | 11/2006 | Doi |
| 2006/0256900 A1* | 11/2006 | Doi .............................. 375/347 |
| 2006/0256901 A1 | 11/2006 | Doi |
| 2006/0256902 A1 | 11/2006 | Doi |
| 2006/0256903 A1 | 11/2006 | Doi |
| 2006/0256904 A1 | 11/2006 | Doi |
| 2006/0256905 A1 | 11/2006 | Doi |
| 2007/0147545 A1 | 6/2007 | Doi |
| 2007/0224942 A1 | 9/2007 | Kuramoto et al. |

FOREIGN PATENT DOCUMENTS

| | | |
|---|---|---|
| JP | 2002-77012 | 3/2002 |
| JP | 2002-185374 | 6/2002 |
| JP | 2003-209501 | 7/2003 |
| JP | 2003-283402 | 10/2003 |
| JP | 2005-159504 | 6/2005 |
| WO | 02/47289 | 6/2002 |
| WO | 2006/013677 | 2/2006 |

OTHER PUBLICATIONS

International Preliminary Report on Patentability issued Sep. 25, 2008 in the International (PCT) Application No. PCT/JP2007/055227.

Nobuyoshi Kikuma, "Adaptive Signal Processing with Array Antenna", Kagaku Gijutsu Shuppan, Inc., pp. 125-137, Nov. 25, 1998 (along with Partial English translation).

Yoshio Karasawa, "Fundamentals of Radio Wave Propagations for Digital Mobile Communications" Corona Publishing Co., Ltd., pp. 55-56, Mar. 2003 (along with Partial English translation).

Supplementary European Search Report issued Jun. 13, 2012 in European Application No. EP 07 73 8677.

Rongshan Yu et al., "Lossless Compression of Digital Audio Using Cascaded RLS-LMS Prediction", IEEE Transactions on Speech and Audio Processing, IEEE Service Center, New York, NY, US, vol. 11, No. 6, Nov. 1, 2003, pp. 532-537.

* cited by examiner

ADAPTIVE CONTROL APPARATUS USING MULTIPLE ADAPTIVE CONTROL METHODS

BACKGROUND OF THE INVENTION

1. Field of the Invention

The present invention relates to an adaptive control apparatus that electrically and adaptively controls an antenna directional pattern by controlling weighting coefficients for radio signals received through a plurality of antennas, according to a propagation environment, and relates to a wireless communication apparatus including the adaptive control apparatus.

2. Description of the Related Art

In Patent Document 1, for example, an adaptive control apparatus for avoiding the misconvergence and improving the convergence rate is provided. In this adaptive control apparatus, a plurality of algorithm units compute ratios of combinations of signals received through a plurality of antennas, SIR calculating sections respectively compute SIR values of combined signals which are obtained by combining the signals at the computed ratios of combinations, a determination unit determines which algorithm unit yields the combined signal with the highest quality, and a selection unit selects the combined signal with the highest quality as a received signal. As such, among combined signals obtained by different algorithms, the combined signal having the highest quality is selected as the received signal, and accordingly, even when the computation of weighting coefficients by any of the algorithms becomes unstable or is misconverged for some reason, a combined signal obtained by this algorithm is not selected, but a combined signal obtained by another algorithm is selected. Thus, the computation of weighting coefficients can continue in a stable manner, and a misconvergence can be avoided.

Furthermore, a combining ratio computed by an algorithm with a fast convergence rate is used as an initial value of an algorithm with a slow convergence rate. Accordingly, weighting coefficients computed by a first algorithm unit, which has poor interference wave removal characteristics but has a fast convergence rate, are used as initial values for other second or third algorithm unit, thus improving the convergence rate of the second or third algorithm unit.

Thus, according to the prior art adaptive control apparatus, an adaptive control apparatus can be provided that is capable of avoiding a misconvergence by selecting, as a received signal, a combined signal with the highest quality from among computation results obtained by a plurality of algorithms, and capable of improving a convergence rate by using a combining ratio computed by an algorithm with a fast convergence rate, as an initial value of an algorithm with a slow convergence rate.

Patent Document 1: PCT International Publication WO 02/047289 (FIG. 3).

Non-Patent Document 1: Nobuyoshi KIKUMA, "Adaptive Signal Processing with Array Antenna", Kagaku Gijutsu Shuppan, Inc., pp. 125-137, Nov. 25, 1998.

Non-Patent Document 2: Yoshio KARASAWA, "Fundamentals of Radio Wave Propagations for Digital Mobile Communications", Corona Publishing Co.,Ltd., pp. 55-56, March 2003.

SUMMARY OF THE INVENTION

The prior art adaptive control apparatus has problems such as those described below. In the prior art adaptive control apparatus, although the convergence rate can be increased by using a combining ratio computed by an algorithm with a fast convergence rate, as an initial value of an algorithm with a slow convergence rate, there is a drawback in that control is time-consuming because computation is performed with a plurality of algorithms. In addition, there is also another drawback in that when accelerating the computation by using concurrent computations, it causes the enlargement of a numerical computation processor due to increase in computation amount, or the increase in area for mounting a plurality of numerical computation processors, and thus preventing size reduction of a portable terminal device. Furthermore, there is also a drawback in that the power consumption of the numerical computation processors increases, that is, a fatal defect leading to a reduction in operating time, particularly, in a portable terminal device that operates by a rechargeable battery. In other words, in the prior art adaptive control apparatus, since it takes a long time for a plurality of algorithms to converge, the control cannot be performed following changes in radio wave environment over time due to movement of a user and due to changes in surrounding environment over time. Thus, it has to be said that the prior art adaptive control apparatus is not appropriate.

An object of the present invention is to solve the above-described problems, and to provide an adaptive control apparatus that adaptively controls an antenna directional characteristics such that the best signal quality of demodulated data can be maintained even when a propagation environment rapidly changes, and to provide a wireless communication apparatus including the adaptive control apparatus.

An adaptive control apparatus according to a first invention includes signal control means for performing adaptive control using weighting coefficients for a plurality of radio signals respectively received through a plurality of antennas, and demodulation means for demodulating the adaptively controlled radio signals into demodulated data, the adaptive control apparatus comprising:

first computation means for computing the weighting coefficients using a first adaptive control method in a first computation amount, the first adaptive control method having a first convergence rate and a first convergence error;

second computation means for computing the weighting coefficients from initial values of the weighting coefficients computed by the first computation means, using a second adaptive control method in a second computation amount, and for setting the computed weighting coefficients to the signal control means, the second adaptive control method having a second convergence rate slower than the first convergence rate and a second convergence error smaller than the first convergence error; and control means for controlling determination of a ratio of the first computation amount to the second computation amount based on a moving speed of the adaptive control apparatus, and controlling the first and second computation means to perform computing processes at the determined ratio.

The adaptive control apparatus further comprises detection means for detecting the moving speed of the adaptive control apparatus.

Moreover, the adaptive control apparatus further comprises first measuring means for storing the received radio signals during a certain period of time, and detecting a cycle of changes in the stored radio signals, wherein the control means computes the moving speed of the adaptive control apparatus based on the detected cycle of changes in the stored radio signals.

An adaptive control apparatus of a second invention includes signal control means for performing adaptive control using weighting coefficients for a plurality of radio signals respectively received through a plurality of antennas, and demodulation means for demodulating the adaptively controlled radio signals into demodulated data, the adaptive control apparatus comprising:

first computation means for computing the weighting coefficients using a first adaptive control method in a first computation amount, the first adaptive control method having a first convergence rate and a first convergence error;

second computation means for computing the weighting coefficients from initial values of the weighting coefficients computed by the first computation means, using a second adaptive control method in a second computation amount, and for setting the computed weighting coefficients to the signal control means, the second adaptive control method having a second convergence rate slower than the first convergence rate and a second convergence error smaller than the first convergence error; and first measuring means for storing the received radio signals during a certain period of time, and detecting a cycle of changes in the stored radio signals, control means for controlling computation of a ratio of the first computation amount to the second computation amount based on the detected cycle of changes in the stored radio signals, such that phase changes of the radio signals during performing computing processes by the first and second computation means and a demodulating process by the demodulation means are sufficiently small to perform the demodulating process, and controlling the first and second computation means to perform the computing processes at the computed ratio.

Moreover, in the adaptive control apparatus, the control means controls the respective first and second computation means to perform the computing processes until completing a demodulating process for demodulated data of a certain length by the demodulation means.

Further, the adaptive control apparatus further comprises second measuring means for measuring signal quality of the demodulated data, wherein when the measured signal quality is lower than a certain threshold value, the control means increases the second computation amount and decreases the first computation amount.

Furthermore, the adaptive control apparatus further comprises third measuring means for measuring signal strength of the received radio signals, wherein when the measured signal strength is smaller than a certain threshold value, the control means increases the second computation amount and decreases the first computation amount.

A wireless communication apparatus of a third invention comprises:

an adaptive control apparatus as claimed in any one of claims 1 to 7; and a wireless communication circuit for receives radio signals using the adaptive control apparatus.

Accordingly, an adaptive control apparatus and a wireless communication apparatus including the adaptive control apparatus of the present invention can obtain a demodulated signal with the best signal quality even in a limited control time, by changing the proportions of an algorithm having a fast control speed and an algorithm having a slow control speed but having a small convergence error, in a certain cycle, according to a radio wave propagation environment, and thus can achieve high-quality wireless communication.

BRIEF DESCRIPTION OF THE DRAWINGS

FIG. 3 is a graph showing the relationship of a normalized computation time of the computation unit 9a of FIG. 1, a normalized computation time of a computation unit 9b of FIG. 1 and a normalized computation time of the computation units 9a and 9b, versus a proportion $\alpha$ of a computation amount of a computation unit 9a;

Figure 1:
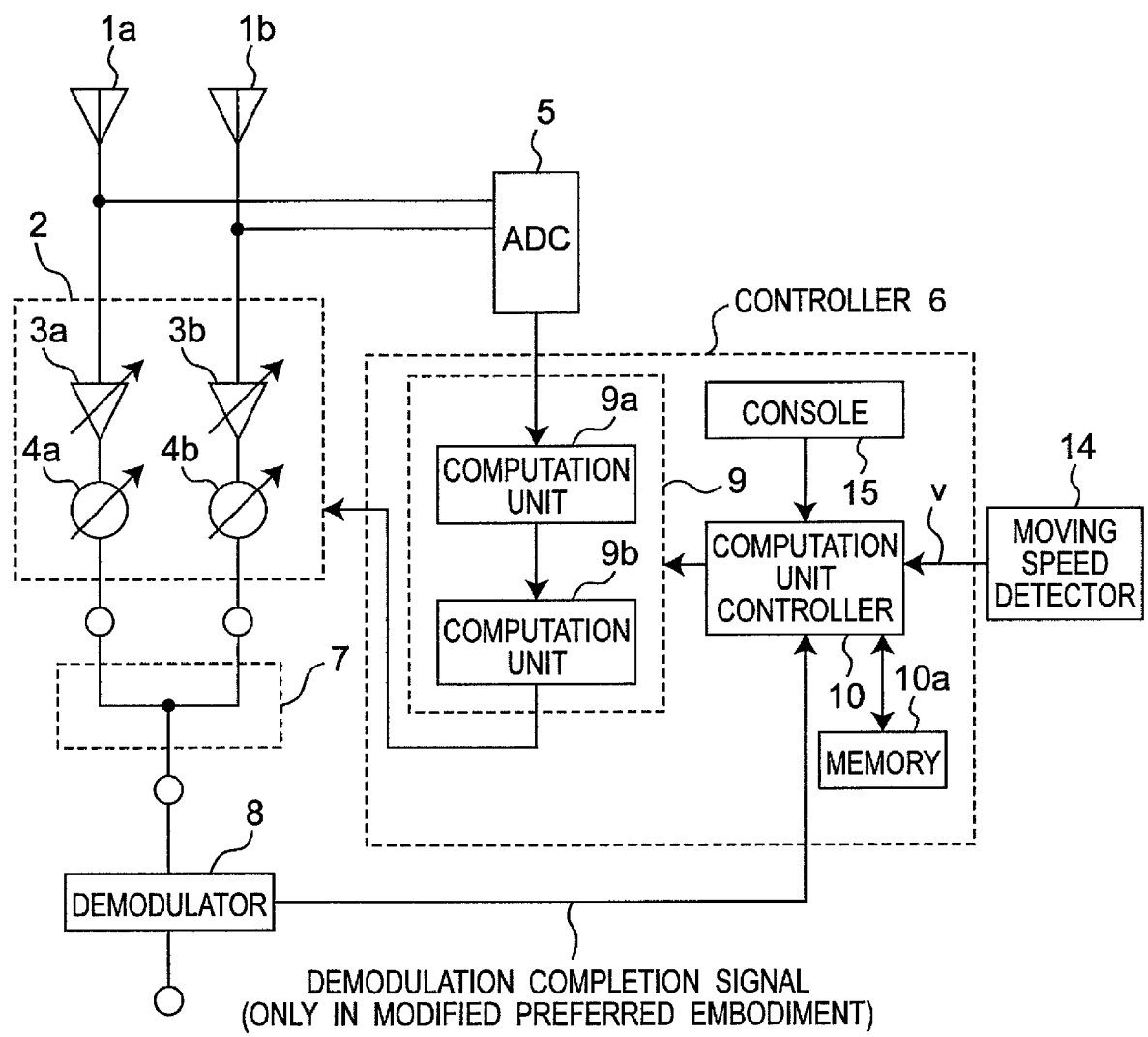
FIG. 1 is a block diagram showing a configuration of an adaptive control apparatus according to a first preferred embodiment of the present invention.

DESCRIPTION OF REFERENCE NUMERALS 1a and 1b: antennas,
2: adaptive control circuit,
3a and 3b: variable amplifiers,
4a and 4b: phase shifters,
5: analog/digital converter circuit (ADC),
6: controller,
7: combiner circuit,
8: demodulator,
9, 9a and 9b: computation units,
10: computation unit controller, 10a and 13: memory,
11: signal quality measuring unit,
12: signal strength measuring unit,
14: moving speed detector,
15: console,
16a and 16b: digital variable amplifiers,
17a and 17b: digital phase shifters,
18: modulator,
19: adaptive antenna apparatus,
20: input circuit,
20A: microphone,
21: output circuit,
21A: speaker,
22: power supply circuit,
23: apparatus controller,
24: wireless communication apparatus.

DETAILED DESCRIPTION OF THE PREFERRED EMBODIMENTS

Preferred embodiments according to the present invention will be described below with reference to the drawings. Note that in the following embodiments, like components are denoted by the same reference numerals.

First Preferred Embodiment

Figure 2:
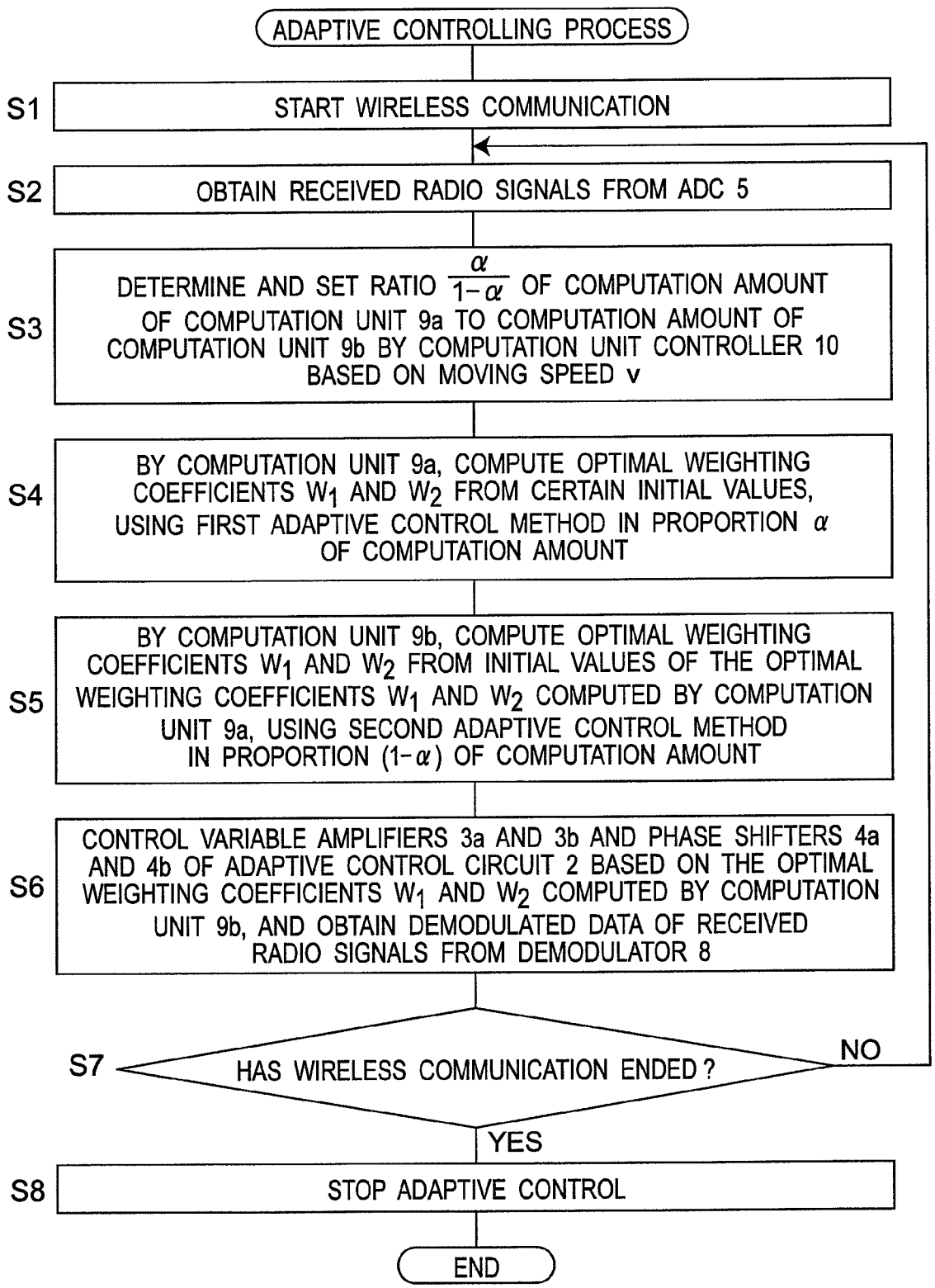
FIG. 2 is a flowchart showing an adaptive controlling process performed by a controller 6 of FIG. 1.

FIG. 1 is a block diagram showing a configuration of an adaptive control apparatus according to a first preferred embodiment of the present invention, and FIG. 2 is a flowchart showing an adaptive controlling process performed by a controller 6 of FIG. 1.

As shown in FIGS. 1 and 2, the adaptive control apparatus according to the first preferred embodiment is characterized in that the apparatus includes a computation unit 9a for computing weighting coefficients, using a first adaptive control method in a proportion $\alpha$ of a first computation amount, where the first adaptive control method has a first convergence rate and a first convergence error, and a computation unit 9b for computing weighting coefficients from initial values of the weighting coefficients computed by the computation unit 9a, using a second adaptive control method in a proportion $(1-\alpha)$ of a second computation amount, where the second adaptive control method has a second convergence rate slower than the first convergence rate and a second convergence error smaller than the first convergence error, and the controller 6 controls determination of a ratio $\alpha/(1-\alpha)$ of the first computation amount to the second computation amount based on a moving speed v of a mobile unit, and controls the respective computation units 9a and 9b to perform computing processes at the determined ratio $\alpha/(1-\alpha)$.

Referring to FIG. 1, radio signals transmitted from a certain remote-side wireless communication apparatus are received through antennas 1a and 1b. A radio signal received through the antenna 1a is inputted to a computation unit 9 of the controller 6 through an analog/digital converter circuit (ADC) 5, and also inputted to a demodulator 8 through a variable amplifier 3a, a phase shifter 4a, and a combiner circuit 7. Similarly, a radio signal received through the antenna 1b is inputted to the computation unit 9 of the controller 6 through the analog/digital converter circuit (ADC) 5, and also inputted to the demodulator 8 through a variable amplifier 3b, a phase shifter 4b, and the combiner circuit 7. The radio signals received through the antennas 1a and 1b are converted to a digital signal x (t) by the analog/digital converter circuit (ADC) 5, and then the digital signal x (t) is inputted to the computation unit 9 of the controller 6. Thus, the digital signal x (t) is a signal vector having two elements.

An adaptive control circuit 2 includes the variable amplifiers 3a and 3b and the phase shifters 4a and 4b. The variable amplifier 3a amplifies the inputted analog radio signal at a amplification factor $A_1$, and then outputs the amplified signal to the phase shifter 4a. Subsequently, the phase shifter 4a shifts a phase of the inputted analog radio signal by a phase shift amount $\phi_1$, and then outputs the phase-shifted signal to the combiner circuit 7. Similarly, the variable amplifier 3b amplifies the inputted radio signal at a amplification factor $A_2$, and then outputs the amplified signal to the phase shifter 4b. Subsequently, the phase shifter 4b shifts a phase of the inputted radio signal by a phase shift amount $\phi_2$, and then outputs the phase-shifted signal to the combiner circuit 7. The combiner circuit 7 combines the two inputted radio signals in power, and then outputs a combined signal y (t), that is combined in power, to the demodulator 8. The demodulator 8 demodulates the inputted radio signal and outputs demodulated data, and when completing the demodulation for the demodulated data, outputs a demodulation completion signal to a computation unit controller 10.

The controller 6 includes the computation unit controller 10, a memory 10a storing a computation-amount versus moving-speed table for determining a computation amount, the computation unit 9 including the two computation units 9a and 9b, and a console 15. A moving speed detector 14 detects a moving speed v of a mobile unit, such as a vehicle etc., carrying the wireless communication apparatus, based on the rotational speed of a motor of the mobile unit, and outputs the moving speed v to the computation unit controller 10. The computation unit controller 10 determines, as will be described in detail later, a ratio $\alpha/(1-\alpha)$ $(0 \leq \alpha \leq 1)$ of a computation amount of the computation unit 9a to a computation amount of the computation unit 9b by referring to the memory 10a based on the detected moving speed v, and sets the computation amounts to the respective computation units 9a and 9b. In the present preferred embodiment, the "computation amount" is defined by, for example, the number of steps associated with a computing process performed by each of the computation units 9a and 9b, or the number of times by which a process (e.g., a loop) including a certain series of steps is performed, etc. In this case, the computation unit controller 10 sets the computation amounts such that the proportion of the computation amount of the computation unit 9a and the computation amount of the computation unit 9b is $\alpha : (1-\alpha)$. In the first preferred embodiment, the computation-amount versus moving-speed table stored in the memory 10a contains, for example, a relationship in which the proportion $\alpha$ of the computation amount of the computation unit 9a is 0.8 when the moving speed v is 80 km/h or more, the proportion $\alpha$ of the computation amount of the computation unit 9a is 0.5 when the moving speed v is 20 km/h or more and less than 80 km/h, and the proportion $\alpha$ of the computation amount of the computation unit 9a is 0.2 when the moving speed v is less than 20 km/h. The computation unit controller 10 reads out this relationship from the computation-amount versus moving-speed table based on the moving speed v, and sets the computation amounts to the respective computation units 9a and 9b. The console 15 includes a wireless communication termination key. When the wireless communication termination key is pressed, the console 15 outputs a wireless communication termination signal to the computation unit controller 10, and in response to this signal, the computation unit controller 10 terminates the wireless communication of the wireless communication apparatus.

The computation unit 9a computes weighting coefficients $W_1$ and $W_2$ for controlling the variable amplifiers 3a and 3b and the phase shifters 4a and 4b of the adaptive control circuit 2, from certain initial values, using the first adaptive control method such as an RLS (Recursive Least-Squares) method etc. in the proportion α of the computation amount, based on the digital radio signal x (t) from the analog/digital converter circuit (ADC) 5, such that a value of a certain evaluation function (e.g., C/(N+I)) for the combined signal y (t) is maximized. Then, the computation unit 9b computes weighting coefficients $W_1$ and $W_2$ for controlling the variable amplifiers 3a and 3b and the phase shifters 4a and 4b of the adaptive control circuit 2, from initial values of the weighting coefficients $W_1$ and $W_2$ computed by the computation unit 9a, using the second adaptive control method such as an LMS (Least Means Squares) method etc. in the proportion (1−α) of the computation amount, based on the digital radio signal x (t) from the analog/digital converter circuit (ADC) 5, such that a value of a certain evaluation function (e.g., C/(N+I)) for the combined signal y (t) is maximized, and sets the weighting coefficients $W_1$ and $W_2$ to the adaptive control circuit 2.

In the first adaptive control method used by the computation unit 9a, the RLS (Recursive Least-Squares) method etc. is adopted, having a fast convergence rate towards an optimal weighting coefficient but with a large convergence error. On the other hand, in the second adaptive control method used by the computation unit 9b, the LMS (Least Means Squares) method etc. is adopted, having a slow convergence rate towards an optimal weighting coefficient but with a small convergence error. A method for computing the weighting coefficients $W_1$ and $W_2$ in the computation units 9a and 9b will be described in detail later. The controller 6 controls the variable amplifiers 3a and 3b and the phase shifters 4a and 4b of the adaptive control circuit 2, based on the optimal weighting coefficients $W_1$ and $W_2$ computed by the computation unit 9b.

Note that in general, the wireless communication apparatus includes radio frequency filters for bandpass filtering of desired radio signals, radio frequency amplifiers for amplifying radio signals, frequency converter circuits including, e.g., mixers for converting a frequency of the radio signals into a certain intermediate frequency, intermediate-frequency amplifier circuits, signal processing circuits, and the like. However, these components are omitted in the block diagram of FIG. 1.

Next, the control operation of a directional adaptive antenna apparatus (hereinafter, referred to as directional adaptive control) will be described. An adaptive antenna apparatus is an apparatus for achieving stable wireless communication by maximizing an antenna radiation pattern in a direction of arrival of a desired radio wave, and steering nulls of the radiation pattern in directions of disturbing interference waves. Meanwhile, for performing stable and high-quality wireless communication even when there is no interference wave, the adaptive antenna apparatus controls its radiation directivity so as to steer a strong beam in a direction of a desired wave to receive the desired wave with a higher strength. Normally, the adaptive antenna apparatus is provided with a variable amplifier and a phase shifter for each antenna, and achieves the maximum desired signal power and the minimum interference signal power by making differences in amplitude and differences in phase among radio signals received through the respective antennas.

When receiving radio signals by the antennas, normally, radio signals of a desired wave and a thermal noise are received. Furthermore, a co-channel interference wave of the same frequency from an adjacent base station, or a delayed wave which is identical to a desired wave but with temporal delay because arriving via a long path may also be received. In an analog wireless communication system using a television receiver, a radio receiver, etc., a delayed wave degrades the quality of, e.g., screen appearance as a ghost of a television broadcast wave. On the other hand, in a digital wireless communication system, each of a thermal noise, a co-channel interference wave, and a delayed wave exerts an influence as bit errors, and thus directly degrades signal quality. Now, let C be the power of a desired wave, let N be the power of the thermal noise, and let I be interference wave power including a co-channel interference wave and a delayed wave. The adaptive antenna apparatus operates to maximize the evaluation function C/(N+I), as a result of improving signal quality.

A method for computing the weighting coefficients in the computation units 9a and 9b is described below. A weighting coefficient $W_i$ is defined by the following equation with an amplification factor $A_i$ and a phase shift amount $\phi_i$:

$$W_i = A_i \cdot \exp(j \cdot \phi_i) \quad (1).$$

In the equation (1), j is the imaginary unit, and i takes a value of 1 or 2. A weighting coefficient $W_1$ is provided for the radio signal from the antenna 1a, and a weighting coefficient $W_2$ is provided for the radio signal from the antenna 1b. That is, the radio signal from the antenna 1a is amplified at a amplification factor $A_1$ by the variable amplifier 3a, and then the phase of the amplified signal is shifted by a phase shift amount $\phi_1$ by the phase shifter 4a. Similarly, the radio signal from the antenna 1b is amplified at a amplification factor $A_2$ by the variable amplifier 3b, and then the phase of the amplified signal is shifted by a phase shift amount $\phi_2$ by the phase shifter 4b. We define W to be a weighting coefficient vector including the weighting coefficients $W_i$ as its elements.

There are several methods to determine a weighting coefficient. In this specification, we describe an example in which a steepest-descent method (hereinafter, referred to as the LMS (Least Means Squares) method) is used. In this technique, the adaptive control apparatus has stored, in advance, a signal sequence r (t) (hereinafter, referred to as a reference signal) included in a known desired wave, and controls so that a received signal approaches to the reference signal. In this case, as an example, assuming that the reference signal is stored in the memory 10a of the controller 6.

Specifically, each of the computation units 9a and 9b multiplies a radio digital signal x (t) by a weighting coefficient w (t) having amplitude and phase components, and determines a residual between the multiplication result and the reference signal r (t). At this time, the residual e (t) is represented by the following equation:

$$e(t) = r(t) - w(t) \times x(t) \quad (2),$$

where the residual e (t) can be a positive or negative value. Therefore, the computation is iterated such that a square of the residual e (t) determined by the equation (2) is minimized. That is, a weighting coefficient w (t, m+1) obtained in the (m+1)-th iteration is represented by the following equation with the m-th weighting coefficient w (t, m):

$$w(t, m+1) = w(t, m) + u \times x(t) \times e(t, m) \quad (3),$$

where u is called step size, and represents a coefficient determining the magnitude of a variation width in one of the iterations. That is, when the step size u is relatively large, since the variation width in one iteration is large, there is an advantage in that the number of iterations to converge the weighting coefficient to the minimum is relatively small. However, when the step size u is too large, there is a drawback in that the oscillation around the minimum occurs in the iterations. Thus, it is necessary to take sufficient care to select the step size u, depending on the system. On the other hand, by setting the step size u to be small, the weighting coefficient is converged to the minimum in a stable manner. However, since the variation width in one iteration is small, the number of iterations increases. When the number of iterations increases, it takes a longer time to determine a weighting coefficient. If the time for computing the weighting coefficients is longer than the time during which a surrounding environment varies (e.g., several milliseconds), it is impossible to improve the signal quality by using the weighting coefficients. Hence, when determining the step size u, there is a need to select as fast and stable condition for convergence as possible. The residual e (t, m) is defined by the following equation:

$$e(t,m)=r(t)-w(t,m)\times x(t) \tag{4}$$

The equation (3) is iteratively updated by using the value in the equation (4). Note that a maximum number of the iterations for determining the weighting coefficients should be set such that the time for computing the weighting coefficients is not longer than the switching period of a wireless communication system. Note also that, normally, the radio digital signal x (t) is obtained by averaging a finite number of sample values. By this averaging, it is possible to reduce the influence from an external noise.

Although an exemplary method is described for calculating the weighting coefficients of the wireless communication system based on the LMS, the present invention is not limited thereto. For example, it is also possible to use an RLS (Recursive Least-Squares) method or an SMI (Sample Matrix Inversion) method which allows for faster computation of weighting coefficients. Although these methods compute the weighting coefficients in a faster manner, since these methods are sensitive to an external noise, it may not be possible to achieve desired characteristics at a location with a strong noise. This is because while the LMS method reduces the influence from the external noise by averaging, the RLS method and the SMI method sequentially determine a weighting coefficient using samples from the past up to now, and thus the large noise locally added to a sample being computed exerts a significant influence.

In the case that the modulation scheme of the signal sequence is constant envelope modulation having a constant envelope, such as digital phase modulation, it is also possible to use a CMA (Constant Modulus Algorithm) method. Since such methods for computing weighting coefficients are disclosed in Non-Patent Document 1 and well known, a further explanation is omitted here.

Next, a control method of the adaptive control apparatus according to the first preferred embodiment will be described with reference to FIG. 2. FIG. 2 is a flowchart showing an adaptive controlling process performed by the controller 6 of FIG. 1. Referring to FIG. 2, firstly, in step S1, the antennas 1a and 1b start wireless communication. In step S2, the controller 6 obtains the received radio signals from the analog/digital converter circuit 5, and then in step S3, the computation unit controller 10 determines and sets a ratio $\alpha/(1-\alpha)$ of a computation amount of the computation unit 9a to a computation amount of the computation unit 9b by referring to the memory 10a based on a moving speed v detected by the moving speed detector 14. In this case, supposing that the total of the proportion of the computation amount of the computation unit 9a and the proportion of the computation amount of the computation unit 9b is 1, the proportion of the computation amount of the computation unit 9a by the first adaptive control method is $\alpha$, and the proportion of the computation amount of the computation unit 9b by the second adaptive control method is $1-\alpha$. For example, for the first adaptive control method, the RLS adaptive operation is used which has a faster convergence rate towards an optimal weighting coefficient than that of the second adaptive control method but has a larger convergence error than that of the second adaptive control method, and for the second adaptive control method, the LMS adaptive operation is used which has a slower convergence rate towards an optimal weighting coefficient than that of the first adaptive control method but has a smaller convergence error than that of the first adaptive control method.

Subsequently, in step S4, the computation unit 9a computes optimal weighting coefficients $W_1$ and $W_2$ from certain initial values, using the first adaptive control method, in the proportion $\alpha$ of the computation amount. Thereafter, in step S5, the computation unit 9b computes optimal weighting coefficients $W_1$ and $W_2$ from initial values of the optimal weighting coefficients $W_1$ and $W_2$ computed by the computation unit 9a, using the second adaptive control method, in the proportion $(1-\alpha)$ of the computation amount. Thereafter, in step S6, the controller 6 controls the variable amplifiers 3a and 3b and the phase shifters 4a and 4b of the adaptive control circuit 2 based on the optimal weighting coefficients $W_1$ and $W_2$ computed by the computation unit 9b. The combiner circuit 7 combines a radio signal whose amplitude and phase are respectively changed by the variable amplifier 3a and the phase shifter 4a, and a radio signal whose amplitude and phase are respectively changed by the variable amplifier 3b and the phase shifter 4b, and then the demodulator 8 demodulates the combined radio signal. Furthermore, in step S7, the computation unit controller 10 determines whether or not the wireless communication has ended. If NO, then the process returns to step S2 and repeats the above-described steps, and if YES, then the process goes to step S8. For example, when the wireless communication termination key of the console 15 is pressed, the wireless communication termination signal is inputted to the computation unit controller 10, and based on this input, the computation unit controller 10 determines that the wireless communication has ended. Furthermore, in step S8, the controller 6 stops the adaptive control, and ends the adaptive controlling process.

Next, the control time of the adaptive control apparatus according to the first preferred embodiment will be described. Let $t_{c0}$ (seconds) to be the time required for a computing process of weighting coefficients (from steps S2 to S5 of FIG. 2), let $t_d$(seconds) to be the time required for a demodulating process (step S6 of FIG. 2) of one unit of data (hereinafter, referring to received data of a certain length demodulated in a single demodulating process), and let $t_0$ (seconds) to be, e.g., the time that can be used for the computing process and the demodulating process, which is predetermined by design in view of the entire controlling process by the controller 6. The time $t_c$ (seconds) required for the computing process and the demodulating process is represented by the following equation:

$$t_c=t_{c0}+t_d<t_0 \tag{5}$$

Figure 3:
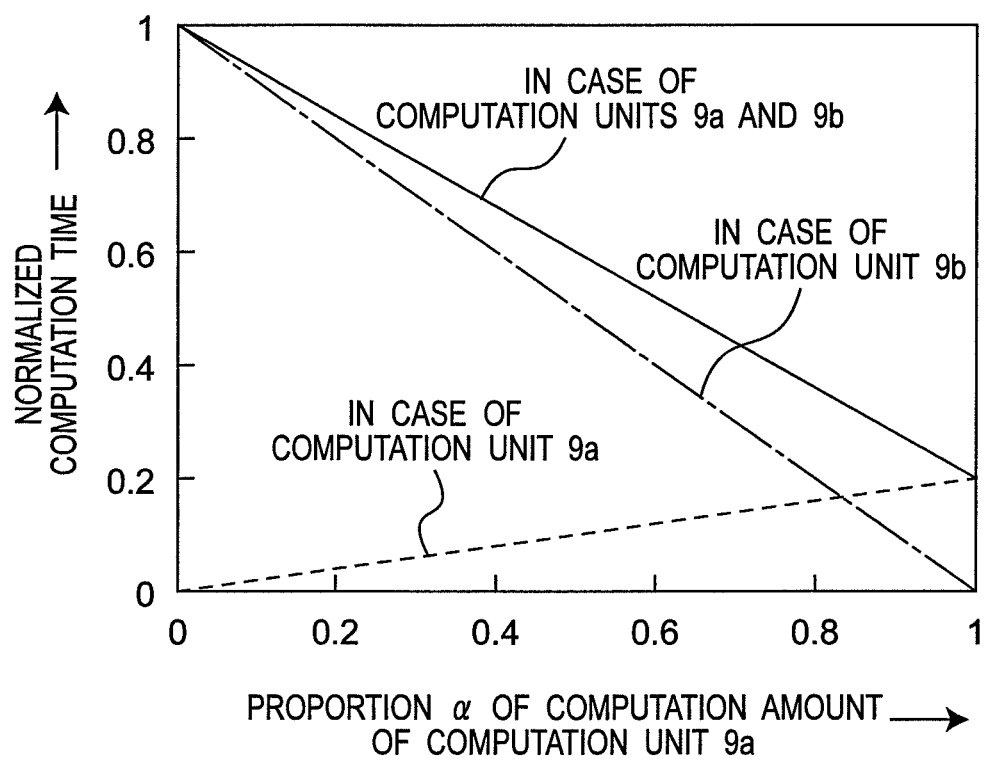

FIG. 3 is a graph showing the relationship of a normalized computation time of the computation unit 9a of FIG. 1, a normalized computation time of a computation unit 9b of FIG. 1 and a normalized computation time of the computation units 9a and 9b, versus a proportion $\alpha$ of a computation amount of a computation unit 9a. Now, as an example, an adaptive control method is used in which the computation time for computing optimal weighting coefficients $W_1$ and $W_2$ by only the computation unit 9b (when $\alpha=0$) is regarded as 1, and the computation time for computing optimal weighting coefficients $W_1$ and $W_2$ by only the computation unit 9b (when α=0) is five times as long as the computation time for computing by only the computation unit 9a (when α=1). Here, in the first preferred embodiment, when the moving speed v is 80 km/h or more, the proportion α of the computation amount of the computation unit 9a is 0.8 and accordingly the normalized computation time of the computation unit 9a is 0.16, the normalized computation time of the computation unit 9b is 0.2, and thus the total normalized computation time is 0.36. When the moving speed v is 20 km/h or more and less than 80 km/h, the proportion α of the computation amount of the computation unit 9a is 0.5 and accordingly the normalized computation time of the computation unit 9a is 0.1, the normalized computation time of the computation unit 9b is 0.5, and thus the total normalized computation time is 0.6. When the moving speed v is less than 20 km/h, the proportion α of the computation amount of the computation unit 9a is 0.2 and accordingly the normalized computation time of the computation unit 9a is 0.04, the normalized computation time of the computation unit 9b is 0.8, and thus the total normalized computation time is 0.84.

As described above, according to the first preferred embodiment, the computation unit controller 10 determines, based on a moving speed v, the ratio $\alpha/(1-\alpha)$ of computation amounts of two adaptive control methods having different convergence rates, convergence errors, etc., the computation unit 9a computes optimal weighting coefficients $W_1$ and $W_2$ using the first adaptive control method in the proportion α of the computation amount, based on the received radio signals, where the first adaptive control method has a faster convergence rate than that of the second adaptive control method, and the computation unit 9b computes optimal weighting coefficients $W_1$ and $W_2$ from initial values of the optimal weighting coefficients $W_1$ and $W_2$ computed by the computation unit 9a, using the second adaptive control method in the proportion (1−α) of the computation amount, based on the received radio signals, where the second adaptive control method has a smaller convergence error than that of the first adaptive control method. Thus, it is possible to compute the optimal weighting coefficients in a fast and accurate manner. Furthermore, by performing two consecutive adaptive controls in one control period, it is more likely that a misconvergence can be avoided.

Although the first adaptive control method uses the RLS method and the second adaptive control method uses the LMS method in the above described first preferred embodiment, the present invention is not limited thereto. For example, the first adaptive control method may use other adaptive operations, such as the RLS method or the SMI method, having a faster convergence rate than that of the second adaptive control method, and the second adaptive control method may also use other adaptive operations having a smaller convergence error than that of the first adaptive control method. Alternatively, the present embodiment can be implemented by using one same computation method for the first adaptive control method and for the second adaptive control method, and changing the variation width in one of the iterations for the optimization computation. For example, in the case of the LMS method, the magnitude of the step size u in the equation (3) is changed. Specifically, the step size u in the first adaptive control method is made larger than the step size u in the second adaptive control method.

Although in the above described first preferred embodiment the method for determining the ratio $\alpha/(1-\alpha)$ is such that the proportion α of the computation amount of the computation unit 9a is 0.8 when the moving speed v is 80 km/h or more, the proportion α of the computation amount of the computation unit 9a is 0.5 when the moving speed v is 20 km/h or more and less than 80 km/h, and the proportion α of the computation amount of the computation unit 9a is 0.2 when the moving speed v is less than 20 km/h, the present invention is not limited thereto. The computation-amount versus moving-speed table stored in the memory 10a may store a relationship in which the proportion α of the computation amount of the computation unit 9a is 1 when the moving speed v is 80 km/h or more, the proportion α of the computation amount of the computation unit 9a is 0.5 when the moving speed v is 20 km/h or more and less than 80 km/h, and the proportion α of the computation amount of the computation unit 9a is 0 when the moving speed v is less than 20 km/h. The threshold values of the moving speed may be other values.

Furthermore, when the adaptive control apparatus communicates with a base station for the first time upon starting communication, it is necessary to certainly establish a connection to the base station even though requiring a relatively long convergence time, and accordingly, the controller 6 may increase the proportion of the second adaptive control method having a relatively small convergence error (i.e., decrease the ratio $\alpha/(1-\alpha)$). In contrast, when the adaptive control apparatus has started the communication, the control should continuously follow a propagation environment varying over time, and accordingly, the proportion of the first adaptive control method having a fast convergence rate is increased (i.e., the ratio $\alpha/(1-\alpha)$ is increased). Thus, it is possible to achieve more optimal adaptive control by changing the proportions of the computation amounts of the first adaptive control method and the second adaptive control method, between when starting communication, and during communication.

Furthermore, the process of step S4 for a second time or later can be performed from initial values of the last optimal weighting coefficients $W_1$ and $W_2$. Thus, when the changes in propagation environment over time are small, changes in the optimal weighting coefficients $W_1$ and $W_2$ are also small, and thus the control time is also reduced. Furthermore, the possibility of a misconvergence is reduced. Hence, it is possible to not only change the proportions of computation amounts of the first and second adaptive control methods, but also to reduce in time the number of the iterations. Accordingly, control can be achieved in a further shortened time.

The computation unit controller 10 may control not only to change the ratio $\alpha/(1-\alpha)$ of computation amounts, but also to reduce both computation amounts of the computation units 9a and 9b when, for example, the moving speed v is 80 km/h or more. Furthermore, although the number of steps associated with a computing process performed by each of the computation units 9a and 9b is used as the definition of a computation amount, other definitions may be used. For example, the computation unit controller 10 may determine a ratio of computation times associated with computing processes performed by the respective computation units 9a and 9b.

Modified Preferred Embodiment of the First Preferred Embodiment

Figure 4:
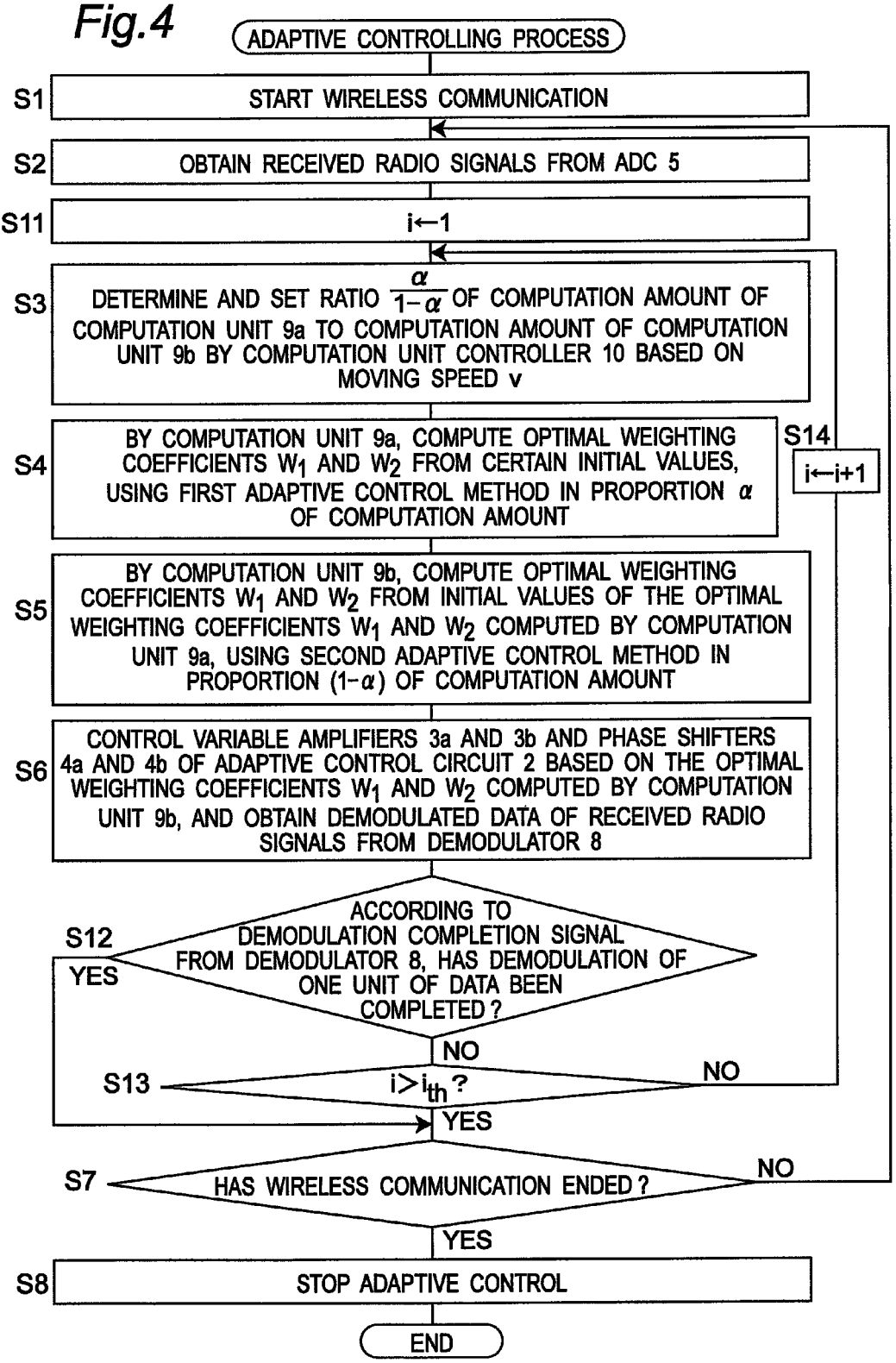
FIG. 4 is a flowchart showing an adaptive controlling process performed by the controller 6 of FIG. 1, according to a modified preferred embodiment of the first preferred embodiment.

FIG. 4 is a flowchart showing an adaptive controlling process performed by the controller 6 of FIG. 1, according to a modified preferred embodiment of the first preferred embodiment. An adaptive control apparatus according to the modified preferred embodiment of the first preferred embodiment is characterized by including the following configuration and processes, as compared to the adaptive control apparatus according to the first preferred embodiment of FIG. 2:

(a) as shown in FIG. 1, the demodulator 8 outputs a demodulation completion signal to the computation unit controller 10 when demodulation of one unit of data has been completed;

(b) as shown in FIG. 4, step S11 is added between steps S2 and S3; and (c) as shown in FIG. 4, steps S12 to S14 are added between steps S6 and S7.

In this case, the present modified preferred embodiment is characterized by performing steps S3 to S6 of the adaptive controlling process according to the demodulation completion signal from the demodulator 8 until completing demodulation of one unit of data, and if not completed, then performing steps S3 to S6 by up to a certain number of times $i_{th}$.

Referring to FIG. 4, firstly, in step S1, the antennas 1a and 1b start wireless communication. In step S2, the controller 6 obtains the received radio signals from the analog/digital converter circuit (ADC) 5, and then in step S11, sets an initial value of 1 to a parameter i. Then, in the same manner as that of FIG. 2, steps S3 to S6 are performed. Furthermore, in step S12, the controller 6 determines, according to the demodulation completion signal from the demodulator 8, whether or not demodulation of one unit of received data has been completed. If YES, then the process goes to step S7, and if NO, then the process goes to step S13 where the controller 6 determines whether or not the parameter i is larger than the threshold number of times $i_{th}$. In step S13, if YES, then the process goes to step S7, and if NO, then the process goes to step S14 where 1 is added to the parameter i and the added result is set to the parameter i, and then the process returns to step S3. Furthermore, the processes in steps S7 and S8 are performed in the same manner as that of FIG. 2.

For the adaptive control apparatus configured in the above-described manner according to the modified preferred embodiment of the first preferred embodiment, its control time will be described. The time $t_c$ (seconds) required for a computing process of the weighting coefficients and a demodulating process of the received data is represented by the following equation:

$$t_c = n(t_{c0} + t_d) < t_0 \quad (6),$$

where $t_{c0}$ (seconds) is the time required for the computing process (from steps S3 to S5 of FIG. 4), $t_d$ (seconds) is the time required for the demodulating process of one unit of data (step S6 of FIG. 4), and n is a natural number, preferably 2 or more.

According to the first preferred embodiment, the ratio $\alpha/(1-\alpha)$ is updated every single demodulating process. On the other hand, in to the modified preferred embodiment of the first preferred embodiment, steps S3 to S6 of the adaptive controlling process are performed according to the demodulation completion signal from the demodulator 8 until completing demodulation of one unit of data. Therefore, the present modified preferred embodiment can determine and set the ratio $\alpha/(1-\alpha)$ of computation amounts based on a moving speed v which varies in real time during the demodulating process of one unit of data. Thus, the present modified preferred embodiment has specific operational effects of being able to perform an adaptive controlling process adapted to real-time conditions by computing optimal weighting coefficients $W_1$ and $W_2$ that accommodate variations in moving speed v, thus demodulating data.

Second Preferred Embodiment

Figure 5:
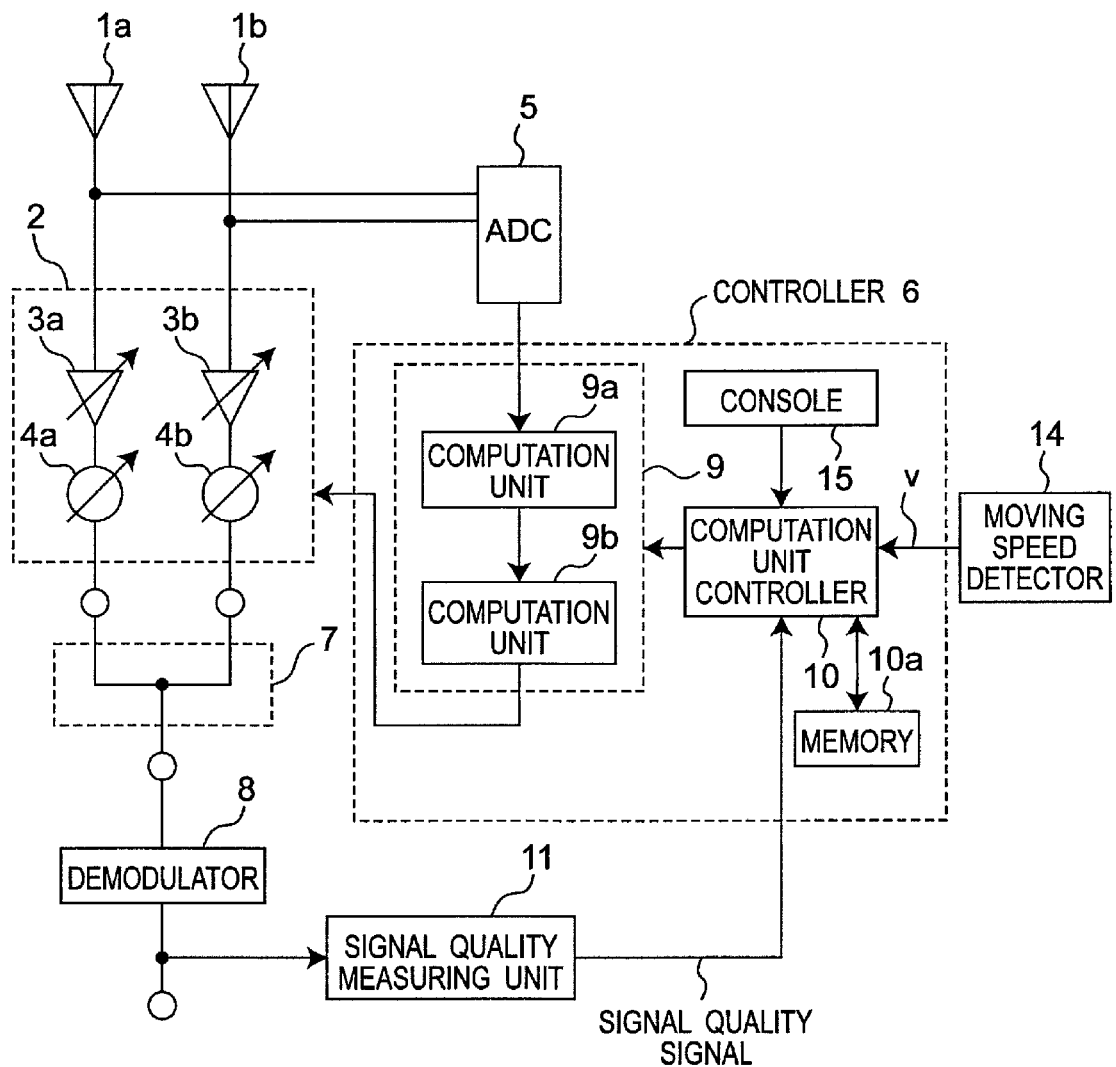
FIG. 5 is a block diagram showing a configuration of an adaptive control apparatus according to a second preferred embodiment of the present invention.

FIG. 5 is a block diagram showing a configuration of an adaptive control apparatus according to a second preferred embodiment of the present invention. The adaptive control apparatus according to the second preferred embodiment is characterized, as compared to the adaptive control apparatus according to the first preferred embodiment of FIG. 1, in that the apparatus further includes a signal quality measuring unit 11 for measuring signal quality of demodulated data inputted from the demodulator 8, as shown in FIG. 5, and the computation unit controller 10 determines the ratio $\alpha/(1-\alpha)$ of the computation amount of the computation unit 9a to the computation amount of the computation unit 9b based on the signal quality measured by the signal quality measuring unit 11.

The signal quality measuring unit 11 measures, for example, a bit error rate, and outputs a signal quality signal indicating the measured result of signal quality, to the computation unit controller 10. Specifically, the signal quality measuring unit 11 computes a bit error rate by comparing a reference bit pattern with a bit pattern of an actually received radio signal on a bit-by-bit basis, and counting the proportion of bits in which an error has occurred. The configuration of a wireless communication apparatus of FIG. 5 is the same as that shown in the block diagram of FIG. 1 except for the signal quality measuring unit 11, and thus a further explanation is omitted.

Figure 6:
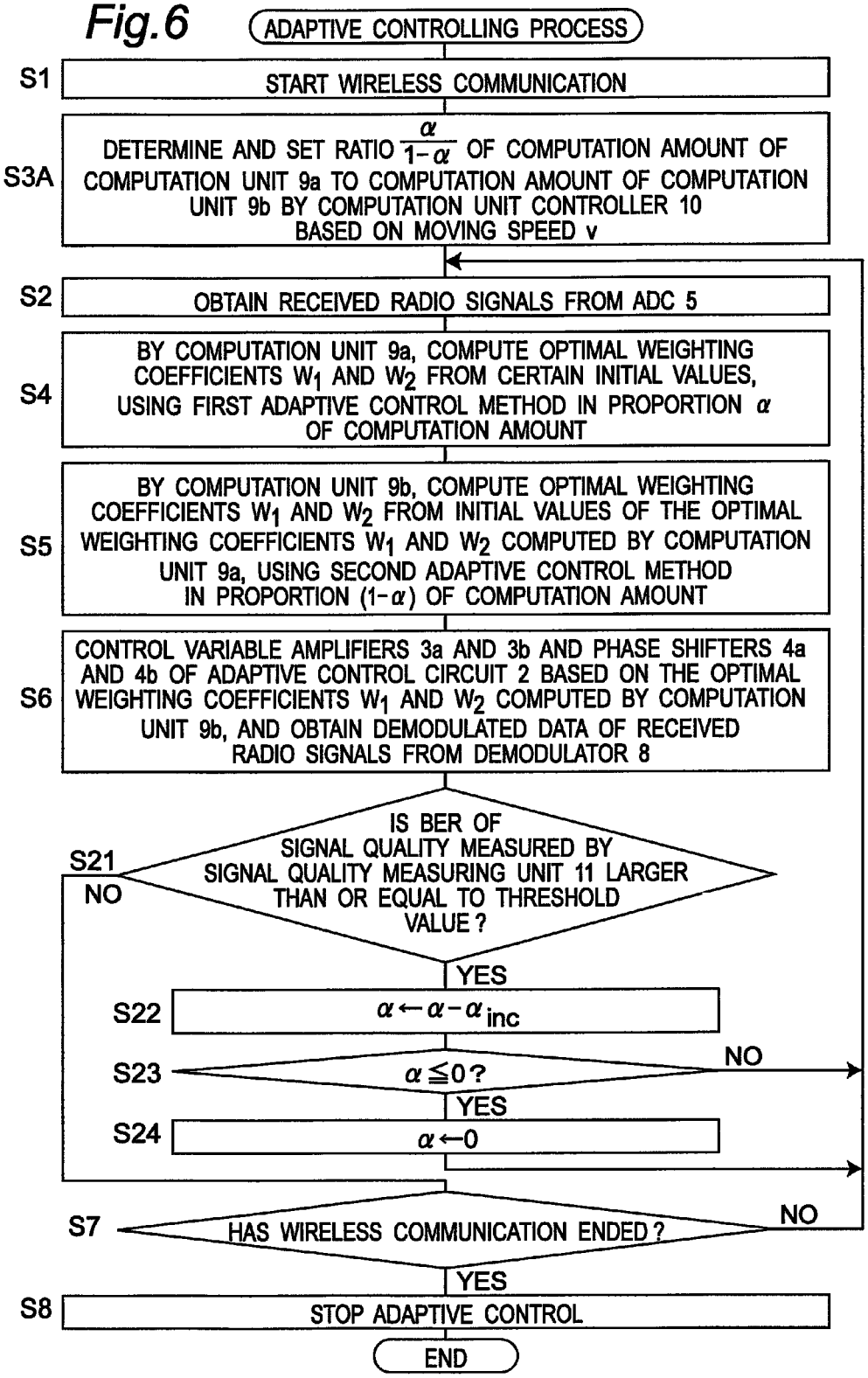
FIG. 6 is a flowchart showing an adaptive controlling process performed by a controller 6 of FIG. 5.

Next, an adaptive controlling process according to the second preferred embodiment will be described with reference to FIG. 6. FIG. 6 is a flowchart showing an adaptive controlling process performed by a controller 6 of FIG. 5. The adaptive controlling process according to the second preferred embodiment is characterized by including the following processes, as compared to the adaptive controlling process according to the first preferred embodiment of FIG. 2:

(a) as shown in FIG. 6, step S3A corresponding to the process step of step S3 of FIG. 2 is added between steps S1 and S2; and (b) as shown in FIG. 6, steps S21 to S24 are added between steps S6 and S7.

In this case, the controller 6 according to the present preferred embodiment is characterized in that when a bit error rate of the signal quality measured by the signal quality measuring unit 11 is larger than or equal to a threshold value (i.e., the signal quality is equal to or lower than a threshold value; YES in step S21), the controller 6 decreases the proportion $\alpha$ of the computation amount of the computation unit 9a in step S22, and performs steps S4 to S6 of the adaptive controlling process.

Referring to FIG. 6, firstly, in step S1, the antennas 1a and 1b start wireless communication. In step S3A, the computation unit controller 10 determines and sets the ratio $\alpha/(1-\alpha)$ of the computation amount of the computation unit 9a to the computation amount of the computation unit 9b by referring to the memory 10a based on the moving speed v detected by the moving speed detector 14. Thereafter, in step S2, the controller 6 obtains the received radio signals from the analog/digital converter circuit 5. Then, in the same manner as that of FIG. 2, steps S4 to S6 are performed. Furthermore, in step S21, the controller 6 determines whether or not the bit error rate of the signal quality measured by the signal quality measuring unit 11 is larger than or equal to a threshold value. If NO, then the process goes to step S7, and if YES, then the process goes to step S22 where the proportion $\alpha$ of the computation amount of the computation unit 9a is subtracted by a certain proportion $\alpha_{inc}$ (preferably, $0 < \alpha_{inc} < 0.1$, e.g., $\alpha_{inc} = 0.01$), and the subtracted result is set as the proportion $\alpha$ of the computation amount of the computation unit 9a. Furthermore, in step S23, the controller determines whether or not the proportion $\alpha$ of the computation amount of the computation unit 9a is 0 or less. If NO, then the process returns to step S2, and if YES, then the process goes to step S24 where 0 is set to the proportion α of the computation amount of the computation unit 9a, and then, the process returns to step S2. Furthermore, the processes in steps S7 and S8 are performed in the same manner as that of FIG. 2. For example, in step S21, the controller 6 determines whether or not the bit error rate of the signal quality is larger than or equal to a threshold value of 0.001.

As described above, according to the second preferred embodiment, optimal weighting coefficients $W_1$ and $W_2$ are computed such that the proportion α of the computation amount of the computation unit 9a having a relatively large convergence error is decreased, and the proportion (1−α) of the computation amount of the computation unit 9b having a relatively small convergence error is increased, thus achieving desired signal quality. Therefore, the present preferred embodiment can determine and set the ratio α/(1−α) of computation amounts based on not only a moving speed v, but also the signal quality of received radio signals. Thus, the present preferred embodiment has specific operational effects of being able to perform a fast and accurate adaptive controlling process by computing optimal weighting coefficients $W_1$ and $W_2$ so as to achieve desired signal quality, thus demodulating data.

Although in the above second preferred embodiment the threshold value of the bit error rate in step S21 of FIG. 6 is 0.001, the present invention is not limited thereto, and the threshold value may be larger or smaller than 0.001 depending on requirements of a wireless communication system. Furthermore, although the signal quality measuring unit 11 measures a bit error rate as an index of signal quality, the present invention is not limited thereto, and in the case of packet communication, a packet error rate may be measured or a throughput etc. may be measured. Specifically, when the signal quality measuring unit 11 measures a packet error rate, it is determined in step S21 whether or not the packet error rate of signal quality is larger than or equal to a threshold value, and when the signal quality measuring unit 11 measures a throughput, it is determined in step S21 whether or not the throughput of signal quality is larger than or equal to a threshold value.

Although in the above second preferred embodiment the proportion α of the computation amount of the computation unit 9a is not changed when a bit error rate of the signal quality measured by the signal quality measuring unit 11 is smaller than the threshold value in step S21 of FIG. 6, the present invention is not limited thereto. When a bit error rate of the signal quality of received radio signals is smaller than the threshold value, i.e., when desired signal quality is achieved, optimal weighting coefficients $W_1$ and $W_2$ may be computed by performing processes from steps S2 to S6 such that the proportion α of the computation amount of the computation unit 9a having a relatively large convergence error is increased by a certain proportion $α_{inc}$.

Modified Preferred Embodiment of the Second Preferred Embodiment

Figure 7:
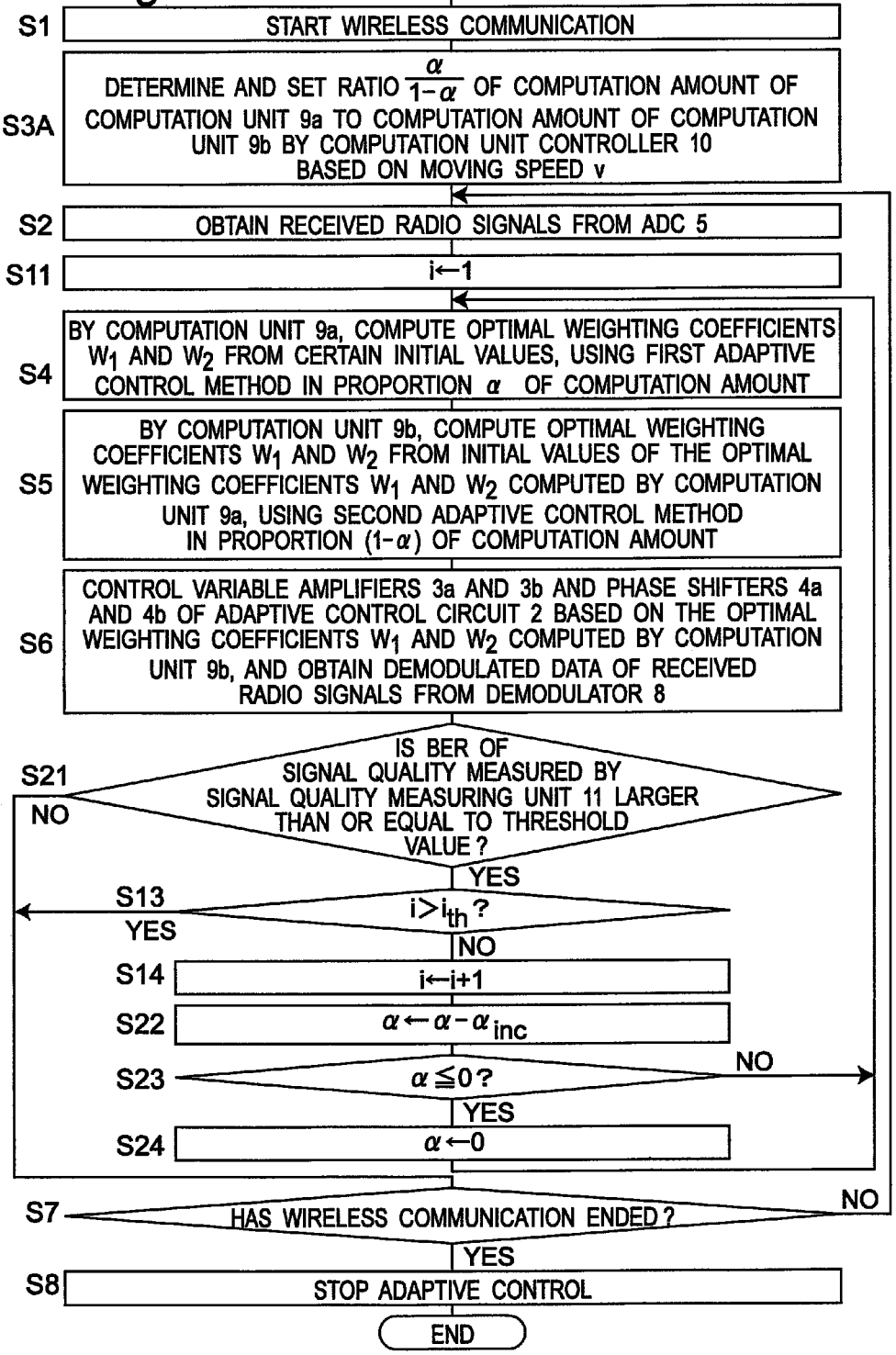
FIG. 7 is a flowchart showing an adaptive controlling process performed by the controller 6 of FIG. 5, according to a modified preferred embodiment of the second preferred embodiment.

FIG. 7 is a flowchart showing an adaptive controlling process performed by the controller 6 of FIG. 5, according to a modified preferred embodiment of the second preferred embodiment. The adaptive controlling process according to the modified preferred embodiment of the second preferred embodiment is characterized by including the following processes, as compared to the adaptive controlling process according to the second preferred embodiment of FIG. 6:

(a) as shown in FIG. 7, step S11 is added between steps S2 and S4; and (b) as shown in FIG. 7, steps S13 and S14 are added between steps S21 and S22.

In this case, the modified preferred embodiment is characterized by performing steps S22 and S4 to S6 of the adaptive controlling process until achieving desired signal quality, and if not achieved, then performing steps S22 and S4 to S6 by up to a certain number of times $i_{th}$.

Referring to FIG. 7, firstly, the processes in steps S1, S3A, and S2 are performed in the same manner as that of FIG. 6. Then, in step S11, the controller 6 sets an initial value of 1 to a parameter i. Furthermore, the processes in steps S4 to S6 and S21 are performed in the same manner as that of FIG. 6. If YES in step S21, then the process goes to step S13 where the controller 6 determines whether or not the parameter i is larger than a threshold number of times $i_{th}$. If YES, then the process goes to step S7, and if NO, then the process goes to step S14 where 1 is added to the parameter i and the added result is set to the parameter i. Furthermore, the processes in steps S22 to S24, S7, and S8 are performed in the same manner as that of FIG. 6.

As described above, according to the modified preferred embodiment of the second preferred embodiment, steps S22 and S4 to S6 of the adaptive controlling process are performed until achieving desired signal quality, and if not achieved, then steps S22 and S4 to S6 are performed by up to the certain number of times $i_{th}$. Thus, the present modified preferred embodiment has specific operational effects of being able to perform a fast and accurate adaptive controlling process by computing optimal weighting coefficients $W_1$ and $W_2$ so as to achieve desired signal quality, thus demodulating data.

Third Preferred Embodiment

Figure 8:
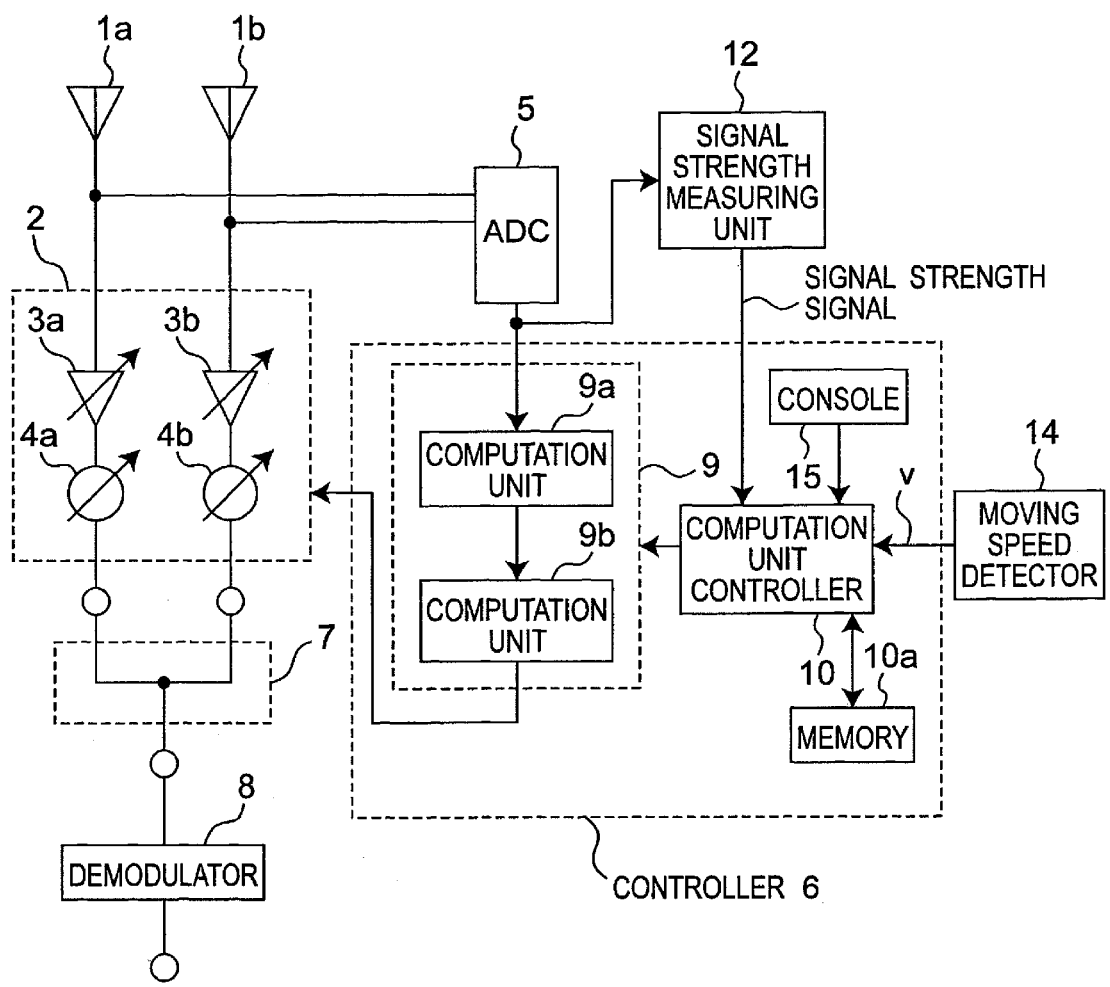
FIG. 8 is a block diagram showing a configuration of an adaptive control apparatus according to a third preferred embodiment of the present invention.

FIG. 8 is a block diagram showing a configuration of an adaptive control apparatus according to a third preferred embodiment of the present invention. The adaptive control apparatus according to the third preferred embodiment is characterized, as compared to the adaptive control apparatus according to the second preferred embodiment of FIG. 5, in that the apparatus further includes, instead of the signal quality measuring unit 11, a signal strength measuring unit 12 for measuring the signal strength of digital signals inputted from the analog/digital converter circuit (ADC) 5, as shown in FIG. 8, and the computation unit controller 10 determines the ratio α/(1−α) of the computation amount of the computation unit 9a to the computation amount of the computation unit 9b based on the signal strength measured by the signal strength measuring unit 12.

The signal strength measuring unit 12, for example, combines powers of two digital signals from the analog/digital converter circuit 5, measures the signal strength of the power-combined digital signal, and outputs a signal strength signal indicating the measured result to the computation unit controller 10. Alternatively, the signal strength measuring unit 12 may measure the signal strength of one of the two digital signals, having a higher signal strength. The configuration of a wireless communication apparatus of FIG. 8 is the same as that shown in the block diagram of FIG. 1 except for the signal strength measuring unit 12, and thus a further explanation is omitted.

Figure 9:
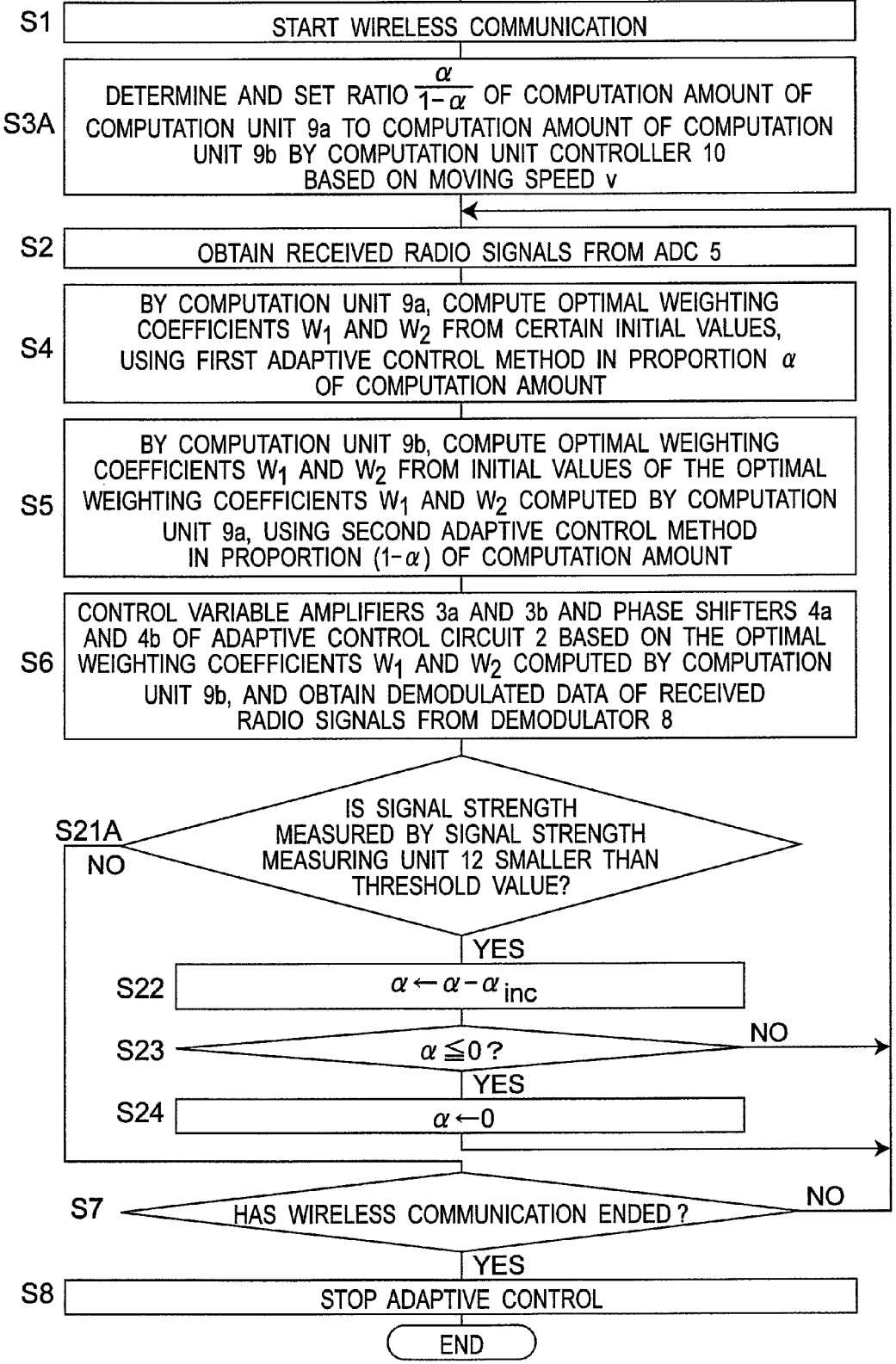
FIG. 9 is a flowchart showing an adaptive controlling process performed by a controller 6 of FIG. 8.

Next, an adaptive controlling process according to the third preferred embodiment will be described with reference to FIG. 9. FIG. 9 is a flowchart showing an adaptive controlling process performed by a controller 6 of FIG. 8. The adaptive controlling process according to the third preferred embodiment is characterized, as compared to the adaptive controlling process according to the second preferred embodiment of FIG. 6, by performing, instead of step S21, a process in step S21A of determining whether or not the signal strength measured by the signal strength measuring unit 12 is smaller than a threshold value is performed, as shown in FIG. 9.

In this case, if the signal strength measured by the signal strength measuring unit 12 is smaller than a threshold value (YES in step S21A), then the controller 6 according to the present preferred embodiment decreases the proportion α of the computation amount of the computation unit 9a in step S22, and then performs steps S4 to S6 of the adaptive controlling process.

As described above, according to the third preferred embodiment, when a desired signal strength is not achieved, optimal weighting coefficients $W_1$ and $W_2$ are computed such that the proportion α of the computation amount of the computation unit 9a having a relatively large convergence error is decreased, and the proportion (1−α) of the computation amount of the computation unit 9b having a relatively small convergence error is increased. Therefore, in the preferred embodiment, the ratio α/(1−α) of computation amounts can be determined and set based on not only the moving speed v, but also the signal strength of received radio signals. Thus, the adaptive control apparatus has specific operational effects of being able to perform a fast and accurate adaptive controlling process by computing optimal weighting coefficients $W_1$ and $W_2$ even when a desired signal strength is not achieved, thus demodulating data.

Although in the above third preferred embodiment the proportion α of the computation amount of the computation unit 9a is not changed when the signal strength measured by the signal strength measuring unit 12 is larger than or equal to the threshold value in step S21A of FIG. 9, the present invention is not limited thereto. When the signal strength of received radio signals is larger than or equal to the threshold value, i.e., when a desired signal strength is achieved (a desired signal-to-thermal-noise ratio (SNR) is achieved), optimal weighting coefficients $W_1$ and $W_2$ may be computed such that the proportion α of the computation amount of the computation unit 9a having a relatively large convergence error is increased by a certain proportion $α_{inc}$.

Modified Preferred Embodiment of the Third Preferred Embodiment

Figure 10:
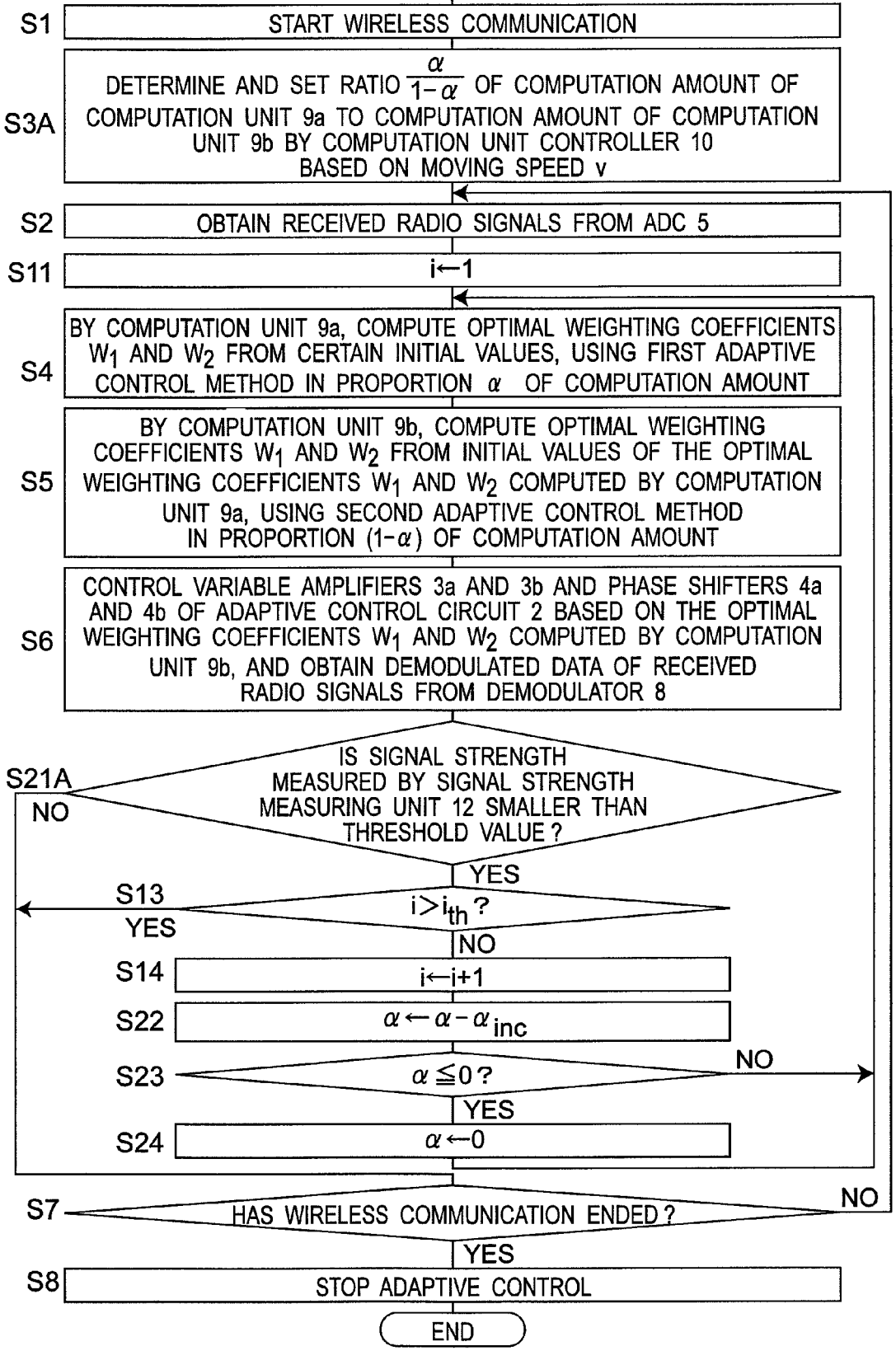
FIG. 10 is a flowchart showing an adaptive controlling process performed by the controller 6 of FIG. 8, according to a modified preferred embodiment of the third preferred embodiment.

FIG. 10 is a flowchart showing an adaptive controlling process performed by the controller 6 of FIG. 8, according to a modified preferred embodiment of the third preferred embodiment. The adaptive controlling process according to the modified preferred embodiment of the third preferred embodiment is characterized by including the following processes, as compared to the adaptive controlling process according to the third preferred embodiment of FIG. 9:

(a) as shown in FIG. 10, step S11 is added between steps S2 and S4; and (b) as shown in FIG. 10, steps S13 and S14 are added between steps S21A and S22.

In this case, the present modified preferred embodiment is characterized by performing steps S22 and S4 to S6 of the adaptive controlling process until achieving a desired signal strength, and not achieved, then performing steps S22 and S4 to S6 by up to a certain number of times $i_{th}$.

Referring to FIG. 10, firstly, the processes in steps S1, S3A, and S2 are performed in the same manner as that of FIG. 9. Then, in step S11, the controller 6 sets an initial value of 1 to a parameter i. Furthermore, the processes in steps S4 to S6 and S21A are performed in the same manner as that of FIG. 9. If YES in step S21A, then the process goes to step S13 where the controller 6 determines whether or not the parameter i is larger than a threshold number of times $i_{th}$. If YES, then the process goes to step S7, and if NO, then the process goes to step S14 where 1 is added to the parameter i and the added result is set to the parameter i. Furthermore, the processes in steps S22 to S24, S7, and S8 are performed in the same manner as that of FIG. 9.

As described above, according to the modified preferred embodiment of the third preferred embodiment, steps S22 and S4 to S6 of the adaptive controlling process are performed until achieving a desired signal strength, and not achieved, then steps S22 and S4 to S6 are performed by up to a certain number of times $i_{th}$. Thus, the adaptive control apparatus has specific operational effects of being able to perform a fast and accurate adaptive controlling process by computing optimal weighting coefficients $W_1$ and $W_2$ even when a desired signal strength is not achieved, thus demodulating data.

Fourth Preferred Embodiment

Figure 11:
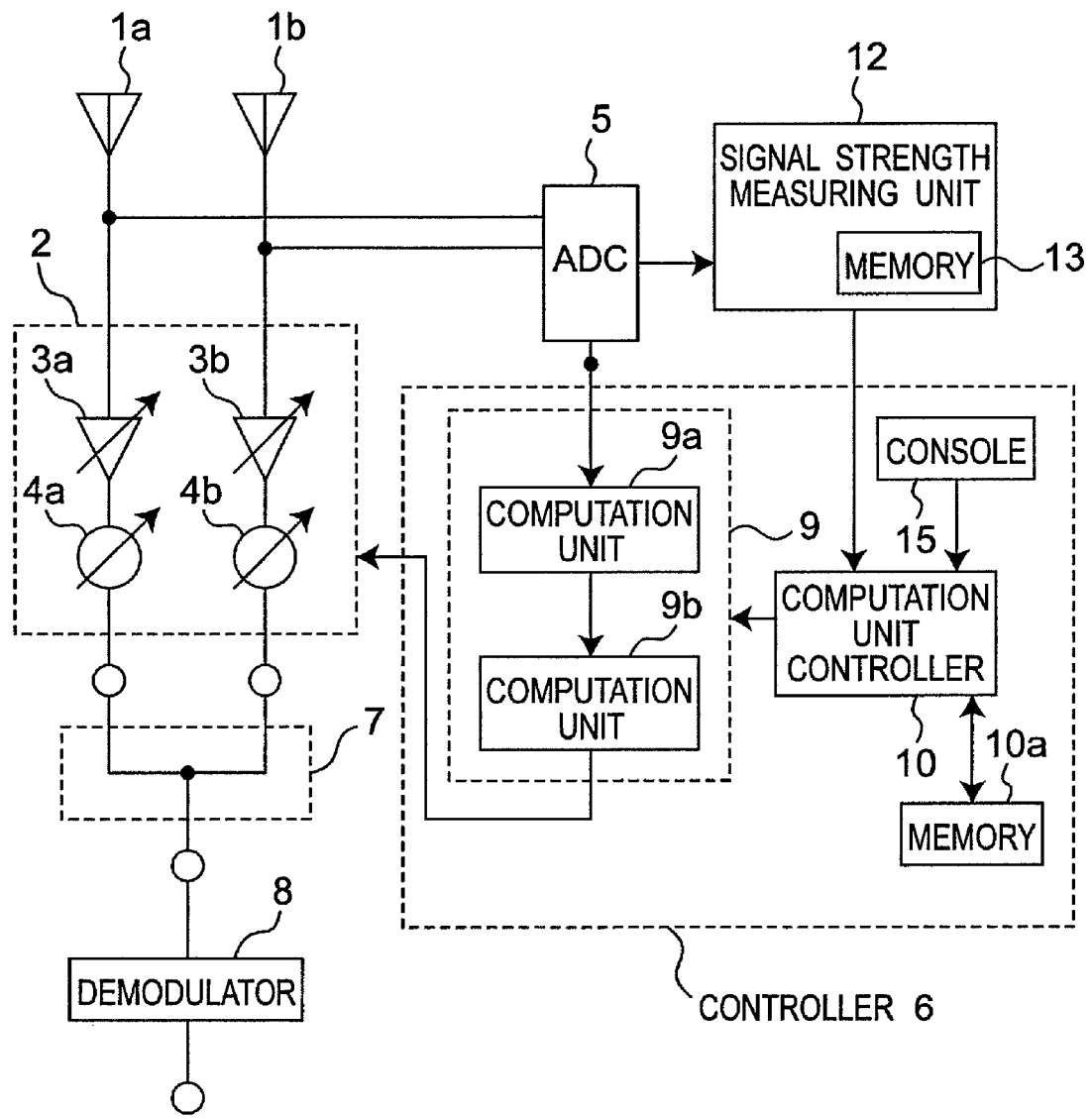
FIG. 11 is a block diagram showing a configuration of an adaptive control apparatus according to a fourth preferred embodiment of the present invention.

FIG. 11 is a block diagram showing a configuration of an adaptive control apparatus according to a fourth preferred embodiment of the present invention. The adaptive control apparatus according to the fourth preferred embodiment is characterized in that the apparatus includes, instead of the moving speed detector 14 of the adaptive control apparatus according to the third preferred embodiment of FIG. 8, a memory 13 in the signal strength measuring unit 12, as shown in FIG. 11, for storing received-signal power of radio signals received during a certain period of time, and after detecting a time interval dt of drops in received-signal power (a cycle of changes in signal strength) from changes in the received-signal power stored in the memory 13, the computation unit controller 10 computes a moving speed v by using the equation (10) based on the detected time interval dt of drops in received-signal power, and then determines and sets the ratio α/(1−α) of the computation amount of the computation unit 9a to the computation amount of the computation unit 9b based on the moving speed v.

The configuration of a wireless communication apparatus of FIG. 11 is the same as that shown in the block diagram of FIG. 8 except for the memory 13, and thus a further explanation is omitted.

When a person using a mobile phone moves at a speed v' (m/s), a phase of a radio wave to be received varies over time by the Doppler effect. According to Non-Patent Document 2, the phase φ is represented by the following equation:

$$\phi = (2\pi \cdot v' \cdot dt \cdot \cos \theta)/\lambda \quad (7),$$

where dt (seconds) is the time interval, θ (rad.) is a difference in angle between an angle of arrival of the radio wave and a moving direction, and λ (m) is the wavelength of the radio wave. In the adaptive control apparatus, it is desirable that the propagation environment is constant or has very small changes, between a time when data of received signals is obtained, and a time after adaptive control for the obtained data. That is, the changes in phase in the equation (7) should be sufficiently small over the adaptive control time. Hence, a maximum of the phase changes φ (rad.) is determined. When the angle of arrival of the radio wave is the same with the moving direction, θ is 0, and thus a maximum phase change is achieved. In this case, the phase change φ is represented by the following equation:

$$\phi = (2\pi \cdot v' \cdot dt)/\lambda \quad (8).$$

Meanwhile, the environment where a mobile phone is used is normally a multipath environment because a base station resides in non line of sight. In this case, a standing wave has its minima each time the phase changes by π (rad.). That is, when φ=π in the equation (8), the speed v' is represented by the following equation:

$$v' = \lambda/(2 \cdot dt) \quad (9).$$

Since the unit of the speed v' in the equation (9) is m/s, the speed v is represented in the unit of km/h by the following equation:

$$v=(60\times 60/1000)v'=(9\cdot\lambda)/(5\cdot dt) \quad (10).$$

The computation unit controller 10 computes a moving speed v of a wireless communication apparatus using the equation (10) based on a detected time interval dt of drops in received-signal power, and then determines the ratio $\alpha/(1-\alpha)$ of the computation amount of the computation unit 9a to the computation amount of the computation unit 9b by referring to the memory 10a based on the moving speed v, and sets the ratio $\alpha/(1-\alpha)$ to the respective computation units 9a and 9b.

Figure 12:
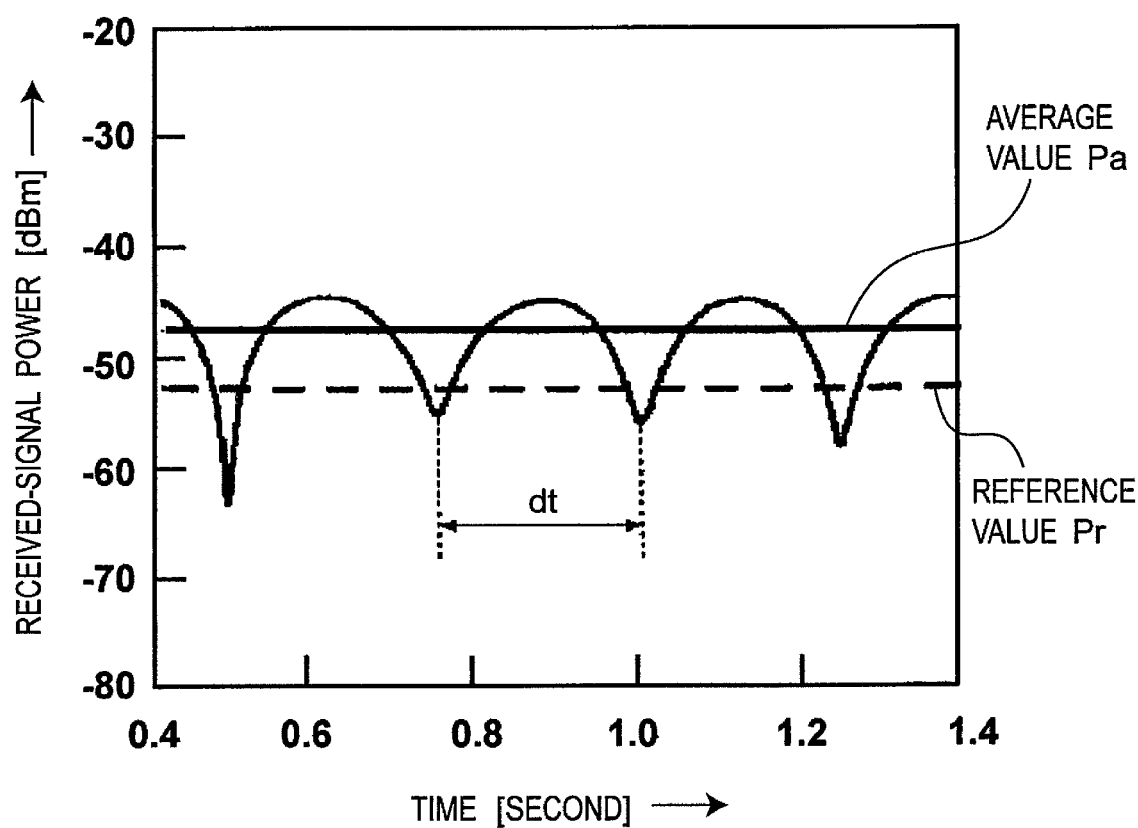
FIG. 12 is a diagram showing an example of variation in received-signal power over time stored in a memory 13 of FIG. 11.

FIG. 12 is a diagram showing an example of variation in received-signal power over time stored in the memory 13 of FIG. 11. It is possible to obtain the time interval dt of drops in received-signal power by setting a certain reference value Pr as shown in FIG. 12, and detecting the number of times by which the power decreases smaller than or equal to the reference value Pr during a certain period of time. In this case, when consecutive samples are smaller than or equal to the reference value Pr, it is counted as one time. As shown in FIG. 12, the reference value Pr is a value lower than an average value Pa of the received-signal power by a certain amount (in this case, 10 dB). This certain amount may be set to be larger or smaller than 10 dB depending on variations in received-signal power.

The time $t_c$ required for one set of a computing process and a demodulating process is from when obtaining received radio signals from the analog/digital converter circuit (ADC) 5, to when demodulating the received radio signals by a demodulator 8. It is desirable that changes in surrounding environment are small during the period from the obtaining process to the demodulating process. For example, the ratio $\alpha/(1-\alpha)$ is controlled such that the time $t_c$ required for one set of a computing process and a demodulating process is, as a rough reference, 1/10 or less of the time interval dt of drops in received-signal power. However, note that the reference for the time $t_c$ required for one set of a computing process and a demodulating process is not limited to 1/10, and may be set to a value other than 1/10 depending on signal quality etc. required by the wireless communication system.

As described above, according to the fourth preferred embodiment, the signal strength measuring unit 12 includes the memory 13 for storing received-signal power of radio signals received during a certain period of time, and after detecting a time interval dt of drops in received-signal power (a cycle of changes in signal strength) from changes in the received-signal power stored in the memory 13, the computation unit controller 10 computes a moving speed v using the equation (10) based on the detected time interval dt of drops in received-signal power, and then determines and sets the ratio $\alpha/(1-\alpha)$ of the computation amount of the computation unit 9a to the computation amount of the computation unit 9b based on the moving speed v. Therefore, the present preferred embodiment can compute the moving speed v also in consideration of a surrounding environment based on the time interval dt of drops in received-signal power and determine and set the ratio $\alpha/(1-\alpha)$ based on the moving speed v in consideration of the surrounding environment. Thus, the present preferred embodiment has specific operational effects of being able to perform a fast and accurate adaptive controlling process by computing optimal weighting coefficients $W_1$ and $W_2$ that accommodate a propagation environment varying over time, thus demodulating data.

Although the configuration of the above fourth preferred embodiment is described in which the memory 13 is included in the signal strength measuring unit 12, the present invention is not limited thereto, and for example, the memory 13 may be configured by a different circuit than the signal strength measuring unit 12. Furthermore, the fourth preferred embodiment may use the method for detecting the moving speed according to the first or second preferred embodiment.

Modified Preferred Embodiment of the Fourth Preferred Embodiment

Figure 13:
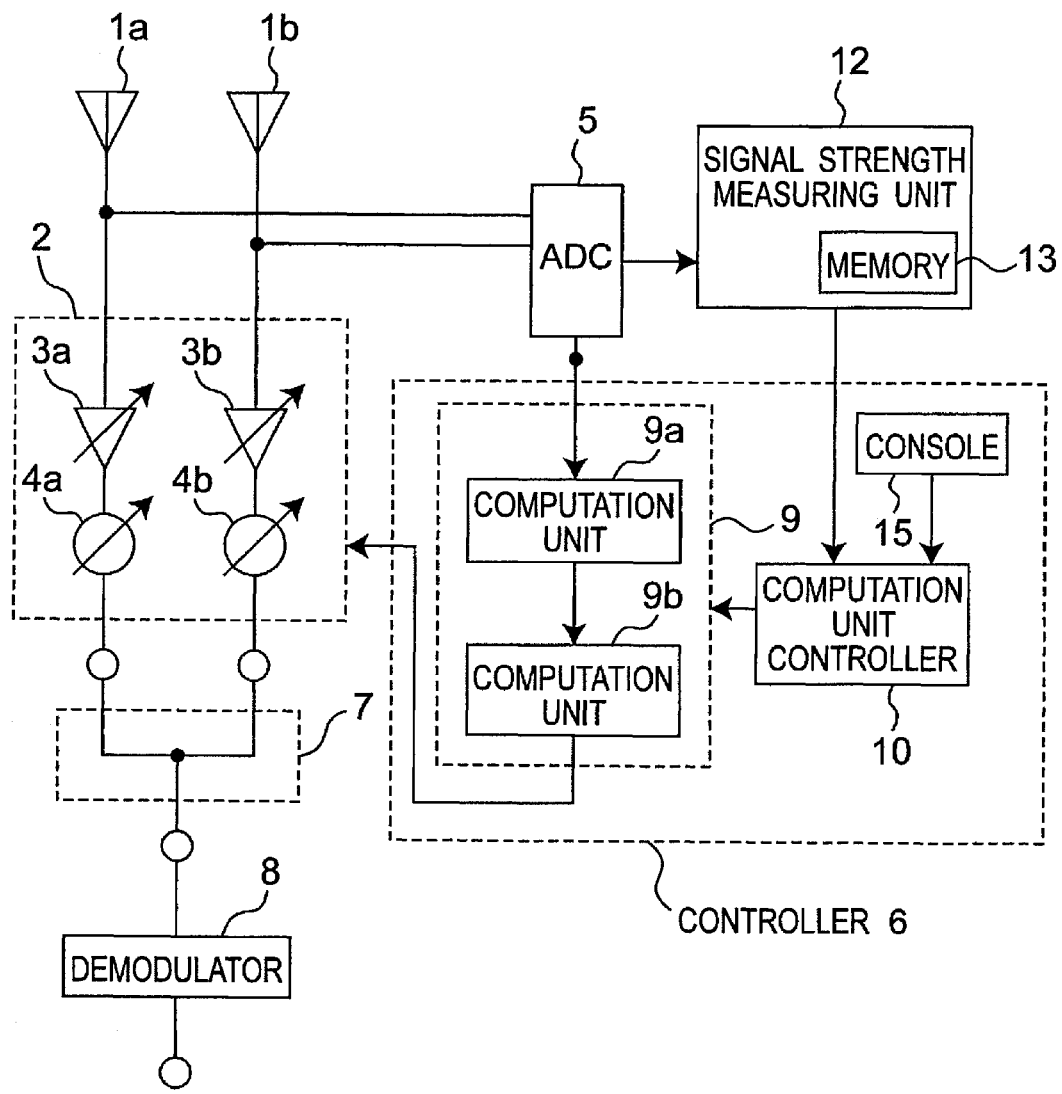
FIG. 13 is a block diagram showing a configuration of an adaptive control apparatus according to a modified preferred embodiment of the fourth preferred embodiment of the present invention.

FIG. 13 is a block diagram showing a configuration of an adaptive control apparatus according to a modified preferred embodiment of the fourth preferred embodiment of the present invention. The adaptive control apparatus according to the modified preferred embodiment of the fourth preferred embodiment is characterized in that the computation unit controller 10 computes and sets the ratio $\alpha/(1-\alpha)$ of the computation amount of the computation unit 9a to the computation amount of the computation unit 9b based on the time interval dt of drops in received-signal power, instead of by referring to the memory 10a of FIG. 11. Specifically, the computation unit controller 10 is characterized by controlling computation of the ratio $\alpha/(1-\alpha)$ of the computation amount of the computation unit 9a to the computation amount of the computation unit 9b based on the time interval dt of drops in received-signal power, such that phase changes of radio signals during performing the computing processes by the respective computation units 9a and 9b and the demodulating process by the demodulator 8 are sufficiently small to perform the demodulating process, and controlling the respective computation units 9a and 9b to perform the computing processes at the computed ratio.

Preferably, the ratio $\alpha/(1-\alpha)$ of computation amounts is controlled such that, as described above, the time $t_c$ required for one set of a computing process and a demodulating process is, for example, 1/10 or less of the time interval dt of drops in received-signal power. Such ratio control will be described in detail below.

In the computing processes by the computation units 9a and 9b, let $\Delta t_1$ and $\Delta t_2$ to be the time required for one step (or one loop). Letting N to be a total computation amount (the number of iterations of the steps or loop), the time $t_{c0}$ required for a computing process of weighting coefficients is obtained by the following equation:

$$t_{c0}=\text{round}(N\alpha)\Delta t_1+\text{round}(N(1-\alpha))\Delta t_2 \quad (11).$$

where the round (*) represents the round-half-up of decimal digits.

By substituting the equation (11) into the equation (5), the time $t_c$ (seconds) required for a computing process of weighting coefficients and a demodulating process of received data is obtained. In this case, letting $t_s$ (seconds) to be, for example, a received-signal slot interval for wireless transmission and reception, the time $t_c$ is represented by the following equation:

$$t_c \leq \max(t_s, \kappa \cdot dt) \quad (12),$$

where dt is the time interval of drops in received-signal power (see FIG. 12), and $\kappa$ is the coefficient of proportionality determined by a demodulation scheme. In the equation (12), in view of suppression of power consumption, it is intended to reduce the frequency of performing the computing process of weighting coefficients (i.e., updating process) as much as possible, and it is assumed that the frequency of updating weighting coefficients becomes the highest in the case when updating for every received-signal slot interval $t_s$. However, note that when the changes in wireless environment are small, and thus the change in received-signal power is slow over the time width of the received-signal slot internal $t_s$ ($\kappa \cdot dt > t_s$), the time $t_c$ should satisfy $t_c < \kappa \cdot dt$. That is, while the changes in wireless environment are small, the weighting coefficients are not updated.

Figure 14:
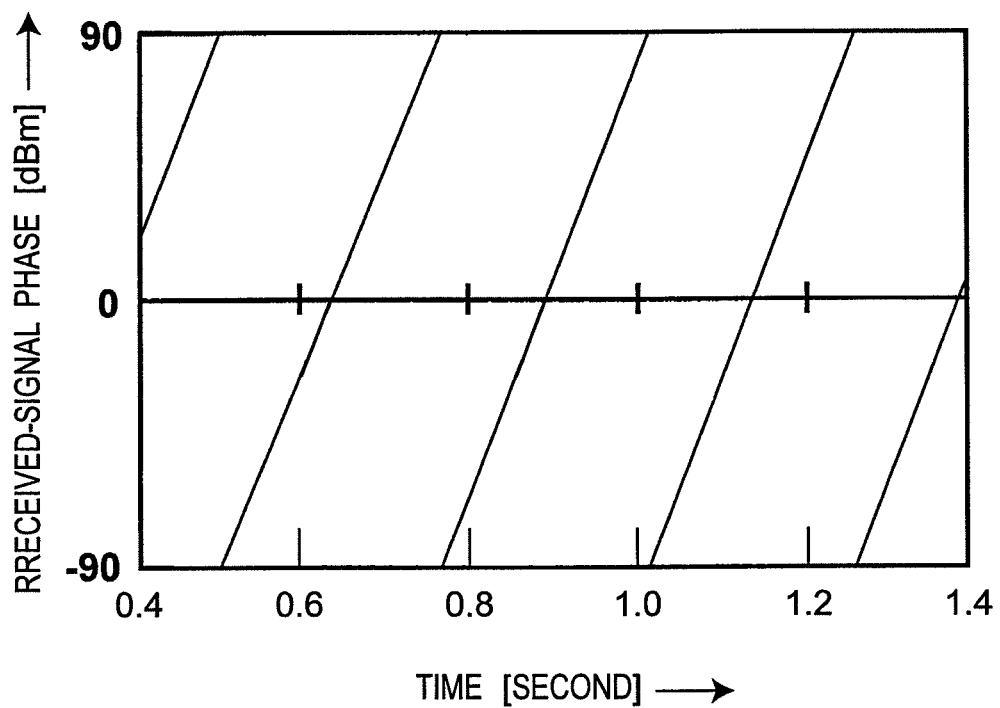
FIG. 14 is a diagram showing an example of the phase variation over time for received signals of FIG. 12.

FIG. 14 is a diagram showing an example of the phase variation over time for received signals of FIG. 12. As shown in FIG. 14, the signal phase changes from −90 degrees to 90 degrees between two drops. That is, the amount of change in phase between the drops is 180 degrees. Thus, the coefficient $\kappa$ should be selected so as to sufficiently reduce error occurring in a demodulation scheme being used. For example, in the case of a QPSK signal, the phase shift $\theta_{max}$ at which no error occurs is as most ±45 degrees. Hence, the maximum of the coefficient $\kappa$ is 1/4 (=45/180). However, note that this value is for an environment where signal power is sufficiently larger than noise power (an environment considered to be without noise), and thus in the case of assuming noise, a smaller value of the coefficient $\kappa$ is desirable, particularly, the coefficient $\kappa=1/10$ (a phase change $\phi_{max}$ of 18 degrees) or less is desirable. In this case, the minimum CNR is 6.5 dB.

As such, the computation unit controller 10 computes the ratio $\alpha/(1-\alpha)$ of the computation amount of the computation unit 9a to the computation amount of the computation unit 9b by using to the equations (5), (11), and (12), based on a time interval dt of drops in received-signal power, such that phase changes of radio signals during performing the computing processes by the respective computation units 9a and 9b and the demodulating process by the demodulator 8 are sufficiently small for performing the demodulating process. At this time, it is preferable to minimize the proportion $\alpha$ of the computing process by the computation unit 9a, and maximize the computing process time by the computation unit 9b.

A CNR is obtained by a ratio of signal power Ps being 1 (amplitude=1), to the maximum value of maximum noise power Pn at which no error is caused. The maximum value of the noise power Pn for the case of phase modulation is obtained by the following equation:

$$P_n = (\sqrt{P_s} \cdot (\theta_{max} - \phi_{max}))^2 \quad (13)$$

In the equation (13), the phases $\theta_{max}$ and $\phi_{max}$ are defined by the following equation in units of (rad.):

$$\theta_{max} = \frac{2\pi}{2n_m} \quad (14)$$

$$\phi_{max} = \kappa \cdot \pi, \quad (15)$$

where $n_m$ is a plurality of values used in the phase modulation, and is 2 for BPSK, 4 for QPSK, and 8 for 8-phase PSK.

In the case of using a modulation scheme other than the phase modulation, by using the minimum $d_{min}$ of symbol intervals in a complex plane, the maximum value of maximum noise power Pn at which no error is caused is obtained by the following equation:

$$P_n = (\sqrt{P_s} \cdot d_{min})^2 \quad (16)$$

When both the computation units 9a and 9b use the same control algorithm (e.g., when both the computation units 9a and 9b use the LMS), the maximum computation error $\epsilon_{max}$ is inversely proportional to the minimum number of steps $N_{min}$ required for convergence.

$$N_{min} = \text{floor}\left(\frac{A}{\epsilon_{max}}\right), \quad (17)$$

where floor (*) represents rounding down of decimal digits, and A represents the value at the start time of control. That is, when $\alpha \neq 1$, the convergence should be achieved by the computation unit 9b, and the following equation should be satisfied:

$$\text{round}(N(1-\alpha)) \geq N_{min9b} = \text{floor}\left(\frac{A_{9b}}{\epsilon_{max9b}}\right). \quad (18)$$

On the other hand, when $\alpha=1$, according to a convergence condition, the maximum computation error $\epsilon_{max9a}$ of the computation unit 9a is set in advance so as to satisfy the following equation:

$$N \geq N_{min9a} = \text{floor}\left(\frac{A_{9a}}{\epsilon_{max9a}}\right) \quad (19)$$

Thus, the minimum of the maximum computation error $\epsilon_{max9a}$ of the computation unit 9a is obtained. On the other hand, the maximum value of the maximum computation error $\epsilon_{max9a}$ of the computation unit 9a is the maximum $A_{9a}$ of an assumed initial value. In practice, the value is set to be smaller than or equal to error required by the system.

As described above, in the adaptive control apparatus according to the modified preferred embodiment of the fourth preferred embodiment, the computation unit controller 10 is characterized by controlling the computation of the ratio $\alpha/(1-\alpha)$ of the computation amount of the computation unit 9a to the computation amount of the computation unit 9b based on the time interval dt of drops in received-signal power, such that phase changes of radio signals during performing the computing processes by the respective computation units 9a and 9b and the demodulating process by the demodulator 8 are sufficiently small to perform the demodulating process, and controlling the respective computation units 9a and 9b to perform the computing processes at the computed ratio.

Fifth Preferred Embodiment

Figure 15:
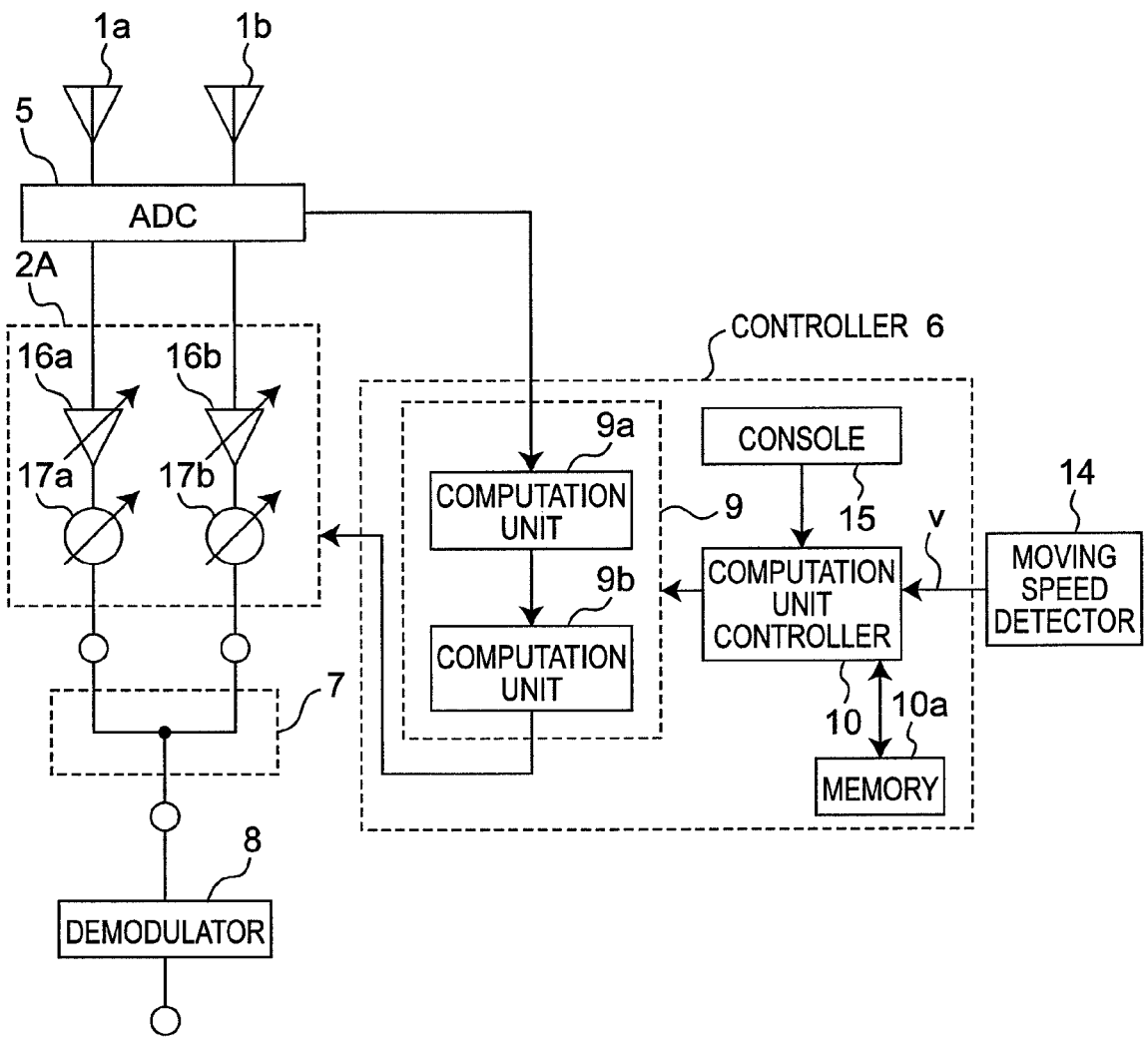
FIG. 15 is a block diagram showing a configuration of an adaptive control apparatus according to a fifth preferred embodiment of the present invention.

FIG. 15 is a block diagram showing a configuration of an adaptive control apparatus according to a fifth preferred embodiment of the present invention. The adaptive control apparatus according to the fifth preferred embodiment is characterized, as compared to the adaptive control apparatus according to the first preferred embodiment of FIG. 1, in that the analog/digital converter circuit (ADC) 5 is inserted between the antennas 1a and 1b and a adaptive control circuit 2A as shown in FIG. 15, and the adaptive control circuit 2A includes digital variable amplifiers 16a and 16b and digital phase shifters 17a and 17b, instead of the analog variable amplifiers 3a and 3b and the analog phase shifters 4a and 4b. In this case, the present preferred embodiment is characterized in that the received radio signals are converted to digital signals, and then the digital signals are amplified and their phases are shifted.

Referring to FIG. 15, a radio signal received through the antenna 1a is converted to a digital signal by the analog/digital converter circuit (ADC) 5, and then the digital signal is amplified by the digital variable amplifier 16a and a phase of the amplified digital signal is shifted by the digital phase shifter 17a. On the other hand, a radio signal received through the antenna 1b is converted to a digital signal by the analog/digital converter circuit (ADC) 5, and then the digital signal is amplified by the digital variable amplifier 16b and a phase of the amplified digital signal is shifted by the digital phase shifter 17b. The configuration of a wireless communication apparatus of FIG. 15 is the same as that shown in the block diagram of FIG. 1 except for the analog/digital converter circuit (ADC) 5, the digital variable amplifiers 16a and 16b, and the digital phase shifters 17a and 17b, and thus a further explanation is omitted.

As described above, according to the fifth preferred embodiment, the received radio signals are converted to the digital signals, and then the digital signals are amplified and their phases are shifted. Therefore, in the present preferred embodiment, the adaptive control circuit 2A can perform digital processing on the received radio signals, instead of analog processing. Thus, the present modified preferred embodiment has specific operational effects of being able to perform a fast and accurate adaptive controlling process, thus demodulating data, and further to achieve a reduction in power consumption.

The fifth preferred embodiment may be provided with a signal quality measuring unit for detecting the signal quality of received data in a similar manner to that of the second preferred embodiment, and the computation unit controller 10 may change the ratio $\alpha/(1-\alpha)$ of computation amounts according to the signal quality. Alternatively, the fifth preferred embodiment may be provided with a signal strength measuring unit for detecting the signal strength of received radio signals in a similar manner to that of the third preferred embodiment, and the computation unit controller 10 may change the ratio $\alpha/(1-\alpha)$ of computation amounts according to the signal strength. Alternatively, the fifth preferred embodiment may be provided with a signal strength measuring unit including a memory for storing received-signal power of received radio signals in a similar manner to that of the fourth preferred embodiment, and the signal strength measuring unit may detect a cycle of changes in signal strength from changes in the stored received-signal power, and the computation unit controller 10 may change the ratio $\alpha/(1-\alpha)$ of computation amounts according to the cycle of changes in signal strength.

Although the configurations using two antennas 1a and 1b are shown in the above preferred embodiments, the present invention is not limited thereto, and three or more antennas may be used. By increasing the number of antennas (N), it is possible to increase the number of interference waves (N-1) to be suppressed, and thus exert a great effect in an environment with many interference waves.

Although the configurations using two adaptive control methods having different convergence rates, convergence errors, etc., are shown in the above preferred embodiments, the present invention is not limited thereto, and three or more adaptive control methods may be used. These adaptive control methods may be sequentially used, or an optimal number of adaptive control methods may be selected according to the propagation environment or moving speed, and such adaptive control methods may be sequentially used.

Although the computation units 9a and 9b are separately indicated in the above preferred embodiments, the present invention is not limited thereto. By using only one computation unit, computation may be performed using a plurality of adaptive control methods.

Sixth Preferred Embodiment

Figure 16:
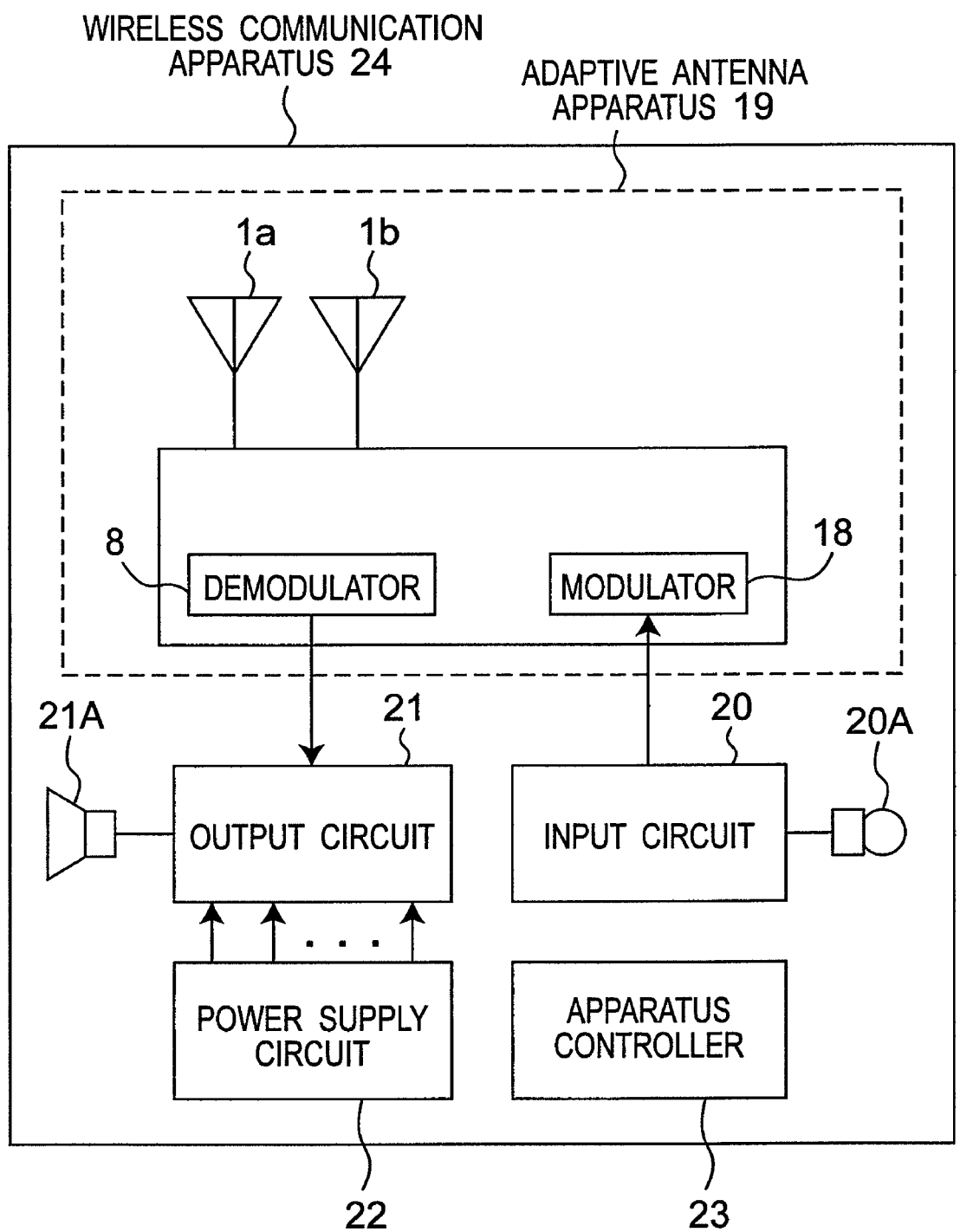
FIG. 16 is a block diagram showing a configuration of a wireless communication apparatus including an adaptive control apparatus, according to a sixth preferred embodiment of the present invention.

FIG. 16 is a block diagram showing a configuration of a wireless communication apparatus 24 according to a sixth preferred embodiment of the present invention, including an adaptive antenna apparatus 19 which is an adaptive control apparatus according to one of the first to fifth preferred embodiments. The wireless communication apparatus 24 according to the sixth preferred embodiment is characterized by configuring the wireless communication apparatus 24 using an adaptive control apparatus according to the above-described preferred embodiments.

Referring to FIG. 16, the wireless communication apparatus 24 includes the adaptive antenna apparatus 19, an input circuit 20 with a microphone 20A, an output circuit 21 with a speaker 21A, a power supply circuit 22 for supplying power to each circuit of the wireless communication apparatus 24, and an apparatus controller 23 for controlling the overall operation of the wireless communication apparatus 24. When the adaptive antenna apparatus 19 is configured as an adaptive control apparatus according to the first, second, third, or fifth preferred embodiment, the adaptive antenna apparatus 19 further includes a moving speed detector 14, or an interface for obtaining a moving speed v from a moving speed detector 14. A voice inputted to the microphone 20A is converted to an electrical signal, and then the electrical signal corresponding to the voice is subjected to processes such as amplification by the input circuit 20. Thereafter, the signal is outputted to a modulator 18 of the adaptive antenna apparatus 19 and subjected to processes in the adaptive antenna apparatus 19, and then transmitted through antenna elements 1a and 1d. On the other hand, a radio signal received by the adaptive antenna apparatus 19 is demodulated to a baseband signal by a demodulator 8 of the adaptive antenna apparatus 19. Thereafter, the baseband signal is inputted to the output circuit 21 and subjected to processes such as amplification, and then outputted from the speaker 21A.

According to the wireless communication apparatus 24 configured in the above-described manner, it is possible to implement a wireless communication apparatus such as a portable radio apparatus that always maintains the best signal quality of received signals and has high signal quality as a system, by computing optimal weighting coefficients in a fast and accurate manner.

Although the wireless communication apparatus 24 includes a wireless receiver circuit and a wireless transmitter circuit in the above described present preferred embodiment, the present invention is not limited thereto. The wireless communication apparatus 24 may include only a wireless receiver circuit.

Industrial Applicability

As described in detail above, an adaptive control apparatus and a wireless communication apparatus including the adaptive control apparatus according to the present invention can obtain a demodulated signal with the best signal quality even in a limited control time, by changing the proportions of an algorithm having a fast control speed and an algorithm having a slow control speed but having a small convergence error, in a certain cycle, according to a radio wave propagation environment, and thus can achieve high-quality wireless communication.

What is claimed is:

1. An adaptive control apparatus including a signal control circuit for performing adaptive control using weighting coefficients for a plurality of radio signals respectively received through a plurality of antennas, and a demodulator for demodulating the adaptively controlled radio signals into demodulated data, the adaptive control apparatus comprising:
a first computation unit for computing the weighting coefficients using a first adaptive control method in a first computation amount, the first adaptive control method having a first convergence rate and a first convergence error;
a second computation unit for computing the weighting coefficients from initial values of the weighting coefficients computed by the first computation unit, using a second adaptive control method in a second computation amount, and for setting the computed weighting coefficients to the signal control circuit, the second adaptive control method having a second convergence rate slower than the first convergence rate and a second convergence error smaller than the first convergence error;

a first measuring unit for storing the received radio signals during a certain period of time, and detecting a cycle of changes in the stored radio signals, and a controller for controlling determination of a ratio of the first computation amount to the second computation amount based on a moving speed of the adaptive control apparatus, controlling the first and second computation unit to perform computing processes at the determined ratio, and computing the moving speed of the adaptive control apparatus based on the detected cycle of changes in the stored radio signals.

2. The adaptive control apparatus as claimed in claim 1 further comprising a detector for detecting the moving speed of the adaptive control apparatus.

3. The adaptive control apparatus as claimed in claim 1, wherein the controller controls the respective first and second computation unit to perform the computing processes until completing a demodulating process for demodulated data of a certain length by the demodulator.

4. The adaptive control apparatus as claimed in claim 1 further comprising a second measuring unit for measuring signal quality of the demodulated data,
wherein when the measured signal quality is lower than a certain threshold value, the controller increases the second computation amount and decreases the first computation amount.

5. The adaptive control apparatus as claimed in claim 1 further comprising a second measuring unit for measuring signal strength of the received radio signals, wherein when the measured signal strength is smaller than a certain threshold value, the controller increases the second computation amount and decreases the first computation amount.

6. An adaptive control apparatus including a signal control circuit for performing adaptive control using weighting coefficients for a plurality of radio signals respectively received through a plurality of antennas, and a demodulator for demodulating the adaptively controlled radio signals into demodulated data, the adaptive control apparatus comprising:
a first computation unit for computing the weighting coefficients using a first adaptive control method in a first computation amount, the first adaptive control method having a first convergence rate and a first convergence error;
a second computation unit for computing the weighting coefficients from initial values of the weighting coefficients computed by the first computation unit, using a second adaptive control method in a second computation amount, and for setting the computed weighting coefficients to the signal control circuit, the second adaptive control method having a second convergence rate slower than the first convergence rate and a second convergence error smaller than the first convergence error;
a first measuring unit for storing the received radio signals during a certain period of time, and detecting a cycle of changes in the stored radio signals; and
a controller for controlling computation of a ratio of the first computation amount to the second computation amount based on the detected cycle of changes in the stored radio signals, such that phase changes of the radio signals during performing computing processes by the first and second computation unit and a demodulating process by the demodulator are sufficiently small to perform the demodulating process, and controlling the first and second computation unit to perform the computing processes at the computed ratio.

7. The adaptive control apparatus as claimed in claim 6, wherein the controller controls the respective first and second computation unit to perform the computing processes until completing a demodulating process for demodulated data of a certain length by the demodulator.

8. The adaptive control apparatus as claimed in claim 6 further comprising a second measuring unit for measuring signal quality of the demodulated data,
wherein when the measured signal quality is lower than a certain threshold value, the controller increases the second computation amount and decreases the first computation amount.

9. The adaptive control apparatus as claimed in claim 6 further comprising a second measuring unit for measuring signal strength of the received radio signals,
wherein when the measured signal strength is smaller than a certain threshold value, the controller increases the second computation amount and decreases the first computation amount.

10. A wireless communication apparatus comprising:
an adaptive control apparatus including a signal control circuit for performing adaptive control using weighting coefficients for a plurality of radio signals respectively received through a plurality of antennas, and a demodulator for demodulating the adaptively controlled radio signals into demodulated data; and
a wireless communication circuit for receiving radio signals using the adaptive control apparatus;
wherein the adaptive control apparatus comprises:
a first computation unit for computing the weighting coefficients using a first adaptive control method in a first computation amount, the first adaptive control method having a first convergence rate and a first convergence error;
a second computation unit for computing the weighting coefficients from initial values of the weighting coefficients computed by the first computation unit, using a second adaptive control method in a second computation amount, and for setting the computed weighting coefficients to the signal control circuit, the second adaptive control method having a second convergence rate slower than the first convergence rate and a second convergence error smaller than the first convergence error;
a first measuring unit for storing the received radio signals during a certain period of time, and detecting a cycle of changes in the stored radio signals; and
a controller for controlling determination of a ratio of the first computation amount to the second computation amount based on a moving speed of the adaptive control apparatus, controlling the first and second computation unit to perform computing processes at the determined ratio, and computing the moving speed of the adaptive control apparatus based on the detected cycle of changes in the stored radio signals.

11. A wireless communication apparatus comprising:
an adaptive control apparatus including a signal control circuit for performing adaptive control using weighting coefficients for a plurality of radio signals respectively received through a plurality of antennas, and a demodulator for demodulating the adaptively controlled radio signals into demodulated data; and a wireless communication circuit for receives radio signals using the adaptive control apparatus;

wherein the adaptive control apparatus comprises:

a first computation unit for computing the weighting coefficients using a first adaptive control method in a first computation amount, the first adaptive control method having a first convergence rate and a first convergence error;

a second computation unit for computing the weighting coefficients from initial values of the weighting coefficients computed by the first computation unit, using a second adaptive control method in a second computation amount, and for setting the computed weighting coefficients to the signal control circuit, the second adaptive control method having a second convergence rate slower than the first convergence rate and a second convergence error smaller than the first convergence error; and a first measuring unit for storing the received radio signals during a certain period of time, and detecting a cycle of changes in the stored radio signals, a controller for controlling computation of a ratio of the first computation amount to the second computation amount based on the detected cycle of changes in the stored radio signals, such that phase changes of the radio signals during performing computing processes by the first and second computation unit and a demodulating process by the demodulator are sufficiently small to perform the demodulating process, and controlling the first and second computation unit to perform the computing processes at the computed ratio.

* * * * *